US009947015B1

(12) United States Patent
Vildosola et al.

(10) Patent No.: US 9,947,015 B1
(45) Date of Patent: Apr. 17, 2018

(54) ANALYZING DIGITAL IMAGES FOR AUTHENTICATING MEMORABILIA ITEMS

(71) Applicants: Hector A Vildosola, San Diego, CA (US); Armando Vildosola, San Diego, CA (US); Eugenio Vildosola, San Diego, CA (US); Diego Vildosola, San Diego, CA (US)

(72) Inventors: Hector A Vildosola, San Diego, CA (US); Armando Vildosola, San Diego, CA (US); Eugenio Vildosola, San Diego, CA (US); Diego Vildosola, San Diego, CA (US)

(*) Notice: Subject to any disclaimer, the term of this patent is extended or adjusted under 35 U.S.C. 154(b) by 0 days.

(21) Appl. No.: 15/588,581

(22) Filed: May 5, 2017

(51) Int. Cl.
*G06T 7/00* (2017.01)
*G06Q 30/00* (2012.01)
*G06K 19/10* (2006.01)
*H04N 7/18* (2006.01)
*G06T 7/70* (2017.01)
*H04W 4/02* (2018.01)
*H04L 29/08* (2006.01)
*G06F 17/30* (2006.01)

(52) U.S. Cl.
CPC ......... *G06Q 30/0185* (2013.01); *G06K 19/10* (2013.01); *G06T 7/70* (2017.01); *H04L 67/306* (2013.01); *H04N 7/183* (2013.01); *H04N 7/185* (2013.01); *H04W 4/02* (2013.01); *G06F 17/30268* (2013.01); *G06F 17/30283* (2013.01); *G06F 17/30525* (2013.01)

(58) Field of Classification Search
None
See application file for complete search history.

(56) References Cited

U.S. PATENT DOCUMENTS

| 2014/0379585 | A1* | 12/2014 | Buelloni | G06Q 20/02 705/76 |
| 2016/0132704 | A1* | 5/2016 | Engels | G06Q 30/0185 340/10.42 |
| 2016/0210635 | A1* | 7/2016 | Alyeshmerni | G06Q 20/40145 |
| 2017/0063553 | A1* | 3/2017 | Saxena | H04L 9/3247 |

FOREIGN PATENT DOCUMENTS

| EP | 3145117 A1 * | 3/2017 | |
| WO | WO 2013173408 A1 * | 11/2013 | ......... G06Q 30/0185 |

* cited by examiner

*Primary Examiner* — Delomia L Gilliard
(74) *Attorney, Agent, or Firm* — Mintz Levin Cohn Ferris Glovsky and Popeo, P.C.

(57) ABSTRACT

A digital image of an item, created by a creator, can be received at an authentication server from a collector. The creator and collector can have profiles on the authentication server. The item can have an associated with the creator. The association can be a mark placed on the item. The co-location of the creator and the collector can be verified at the time of creation of the item. The digital image of the item can be transferred to the collector for verification of its authenticity. A record of ownership can be generated and stored in electronic storage with the digital image. The record of ownership can indicate that the collector owns the item.

20 Claims, 37 Drawing Sheets

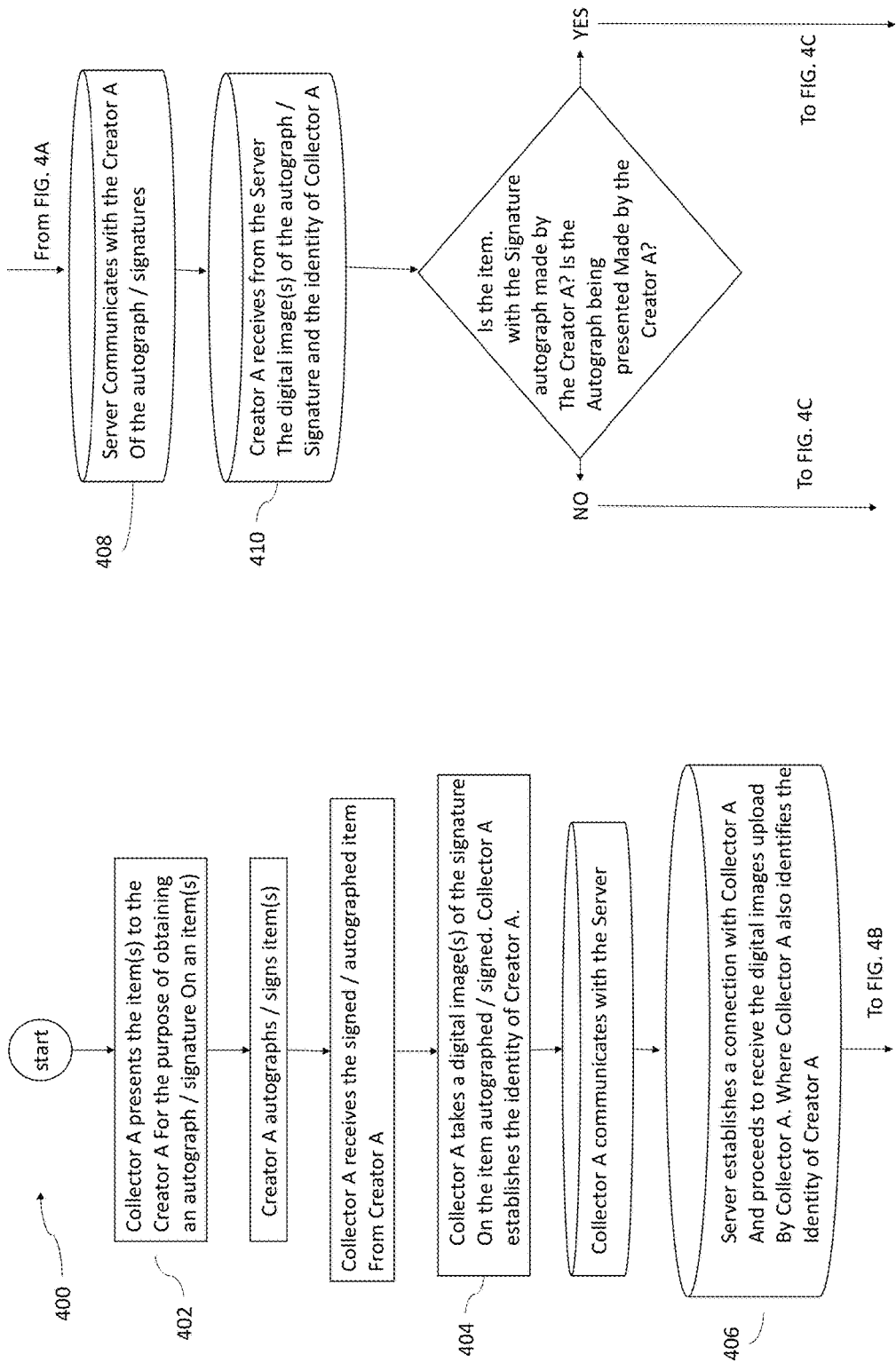

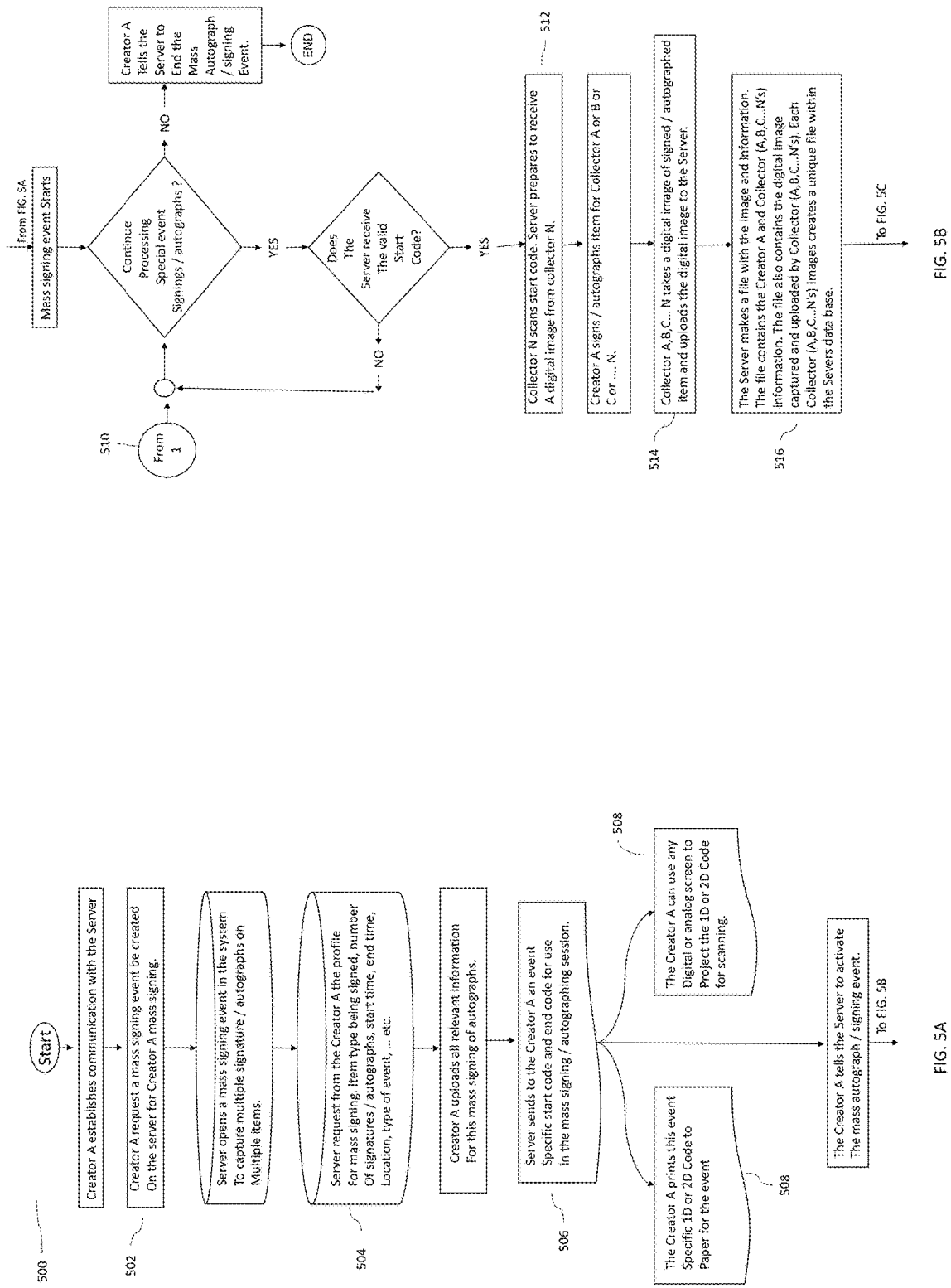

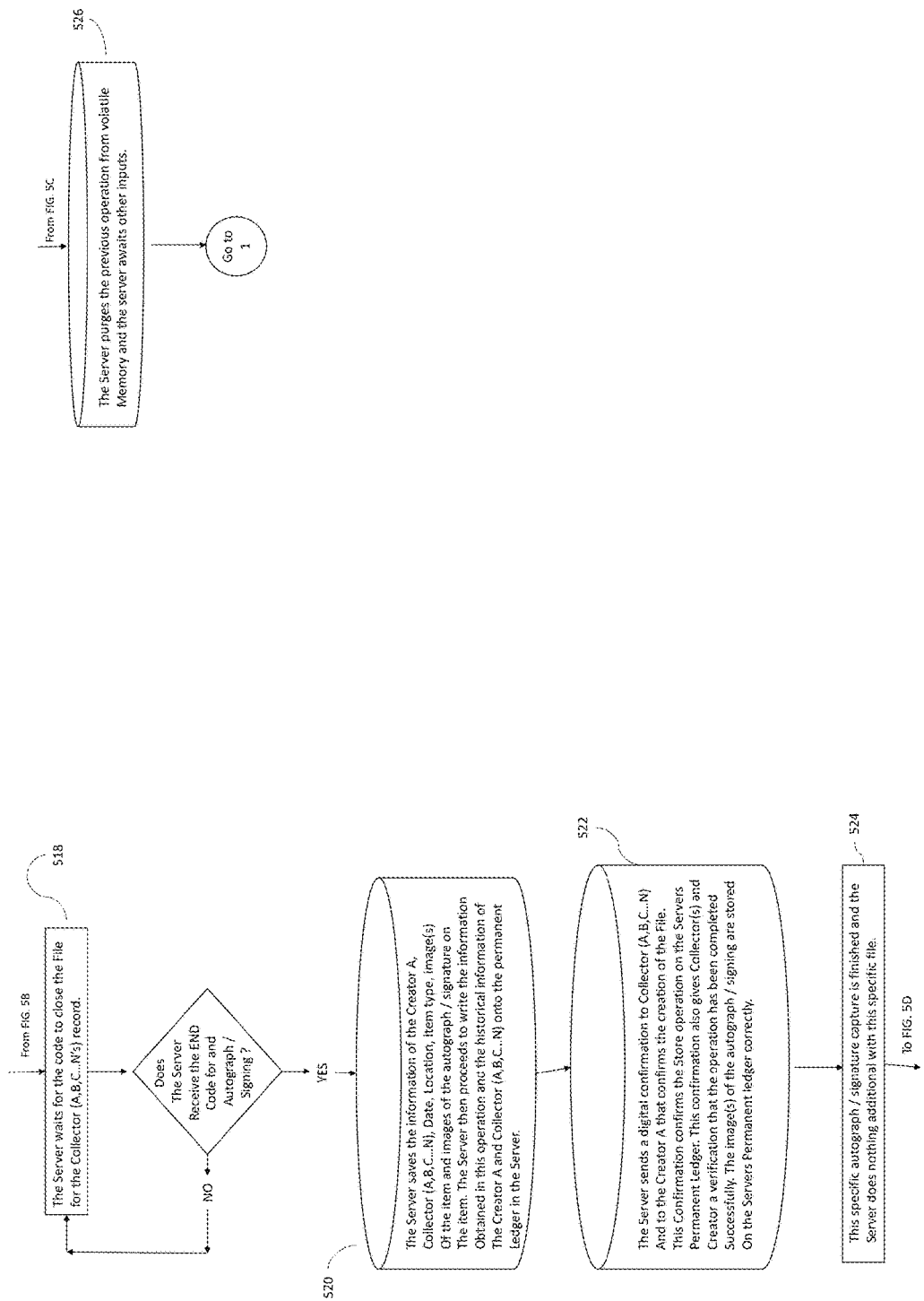

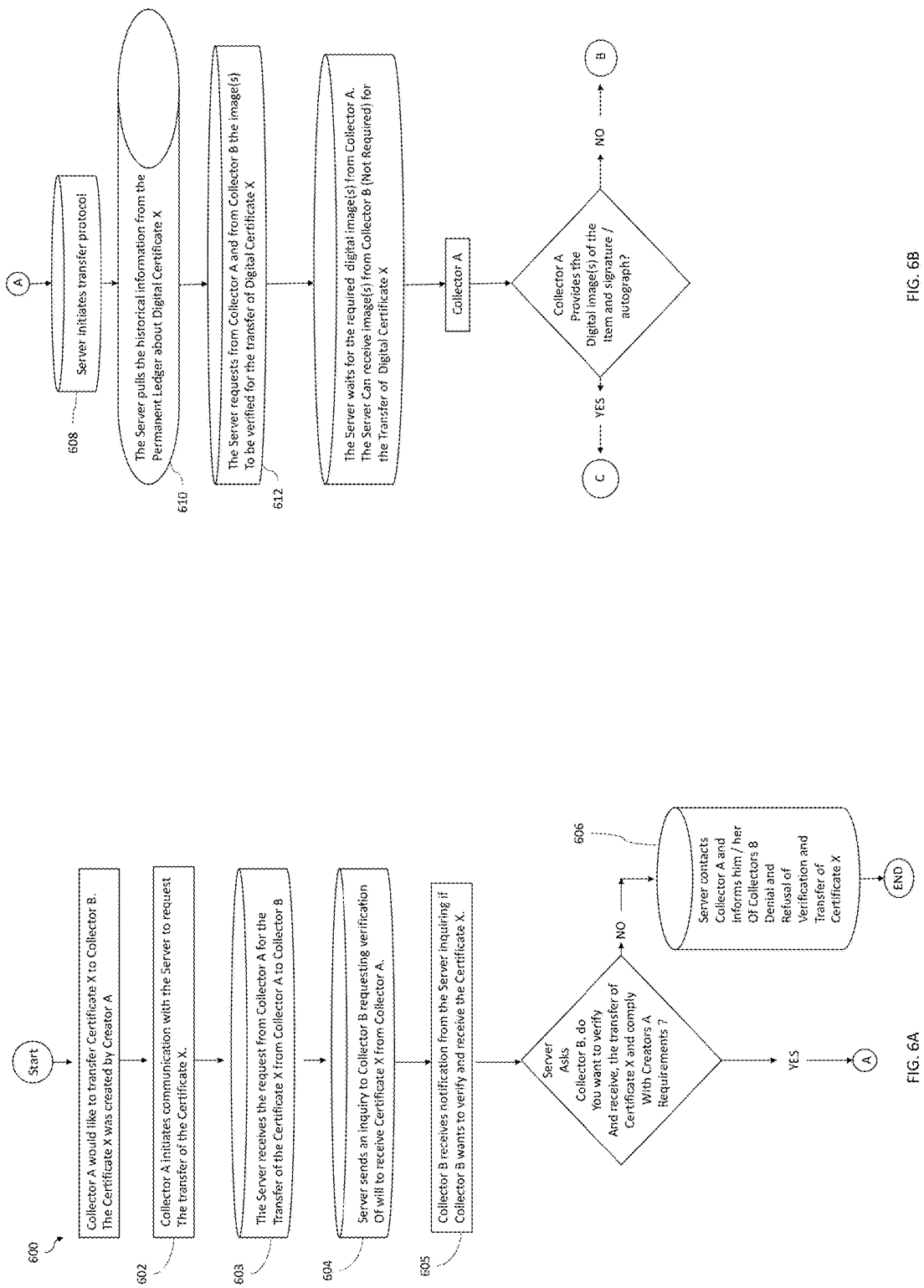

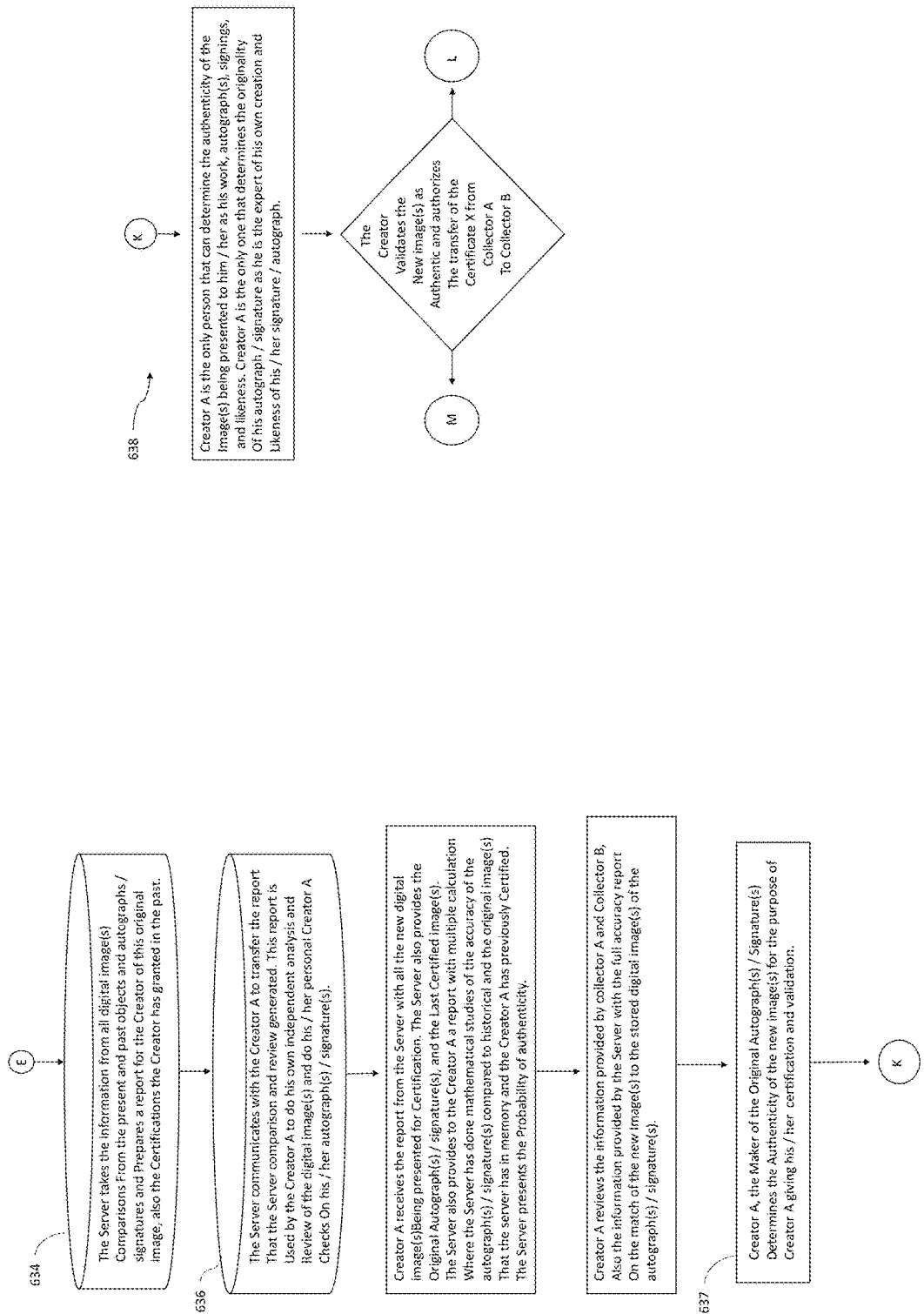

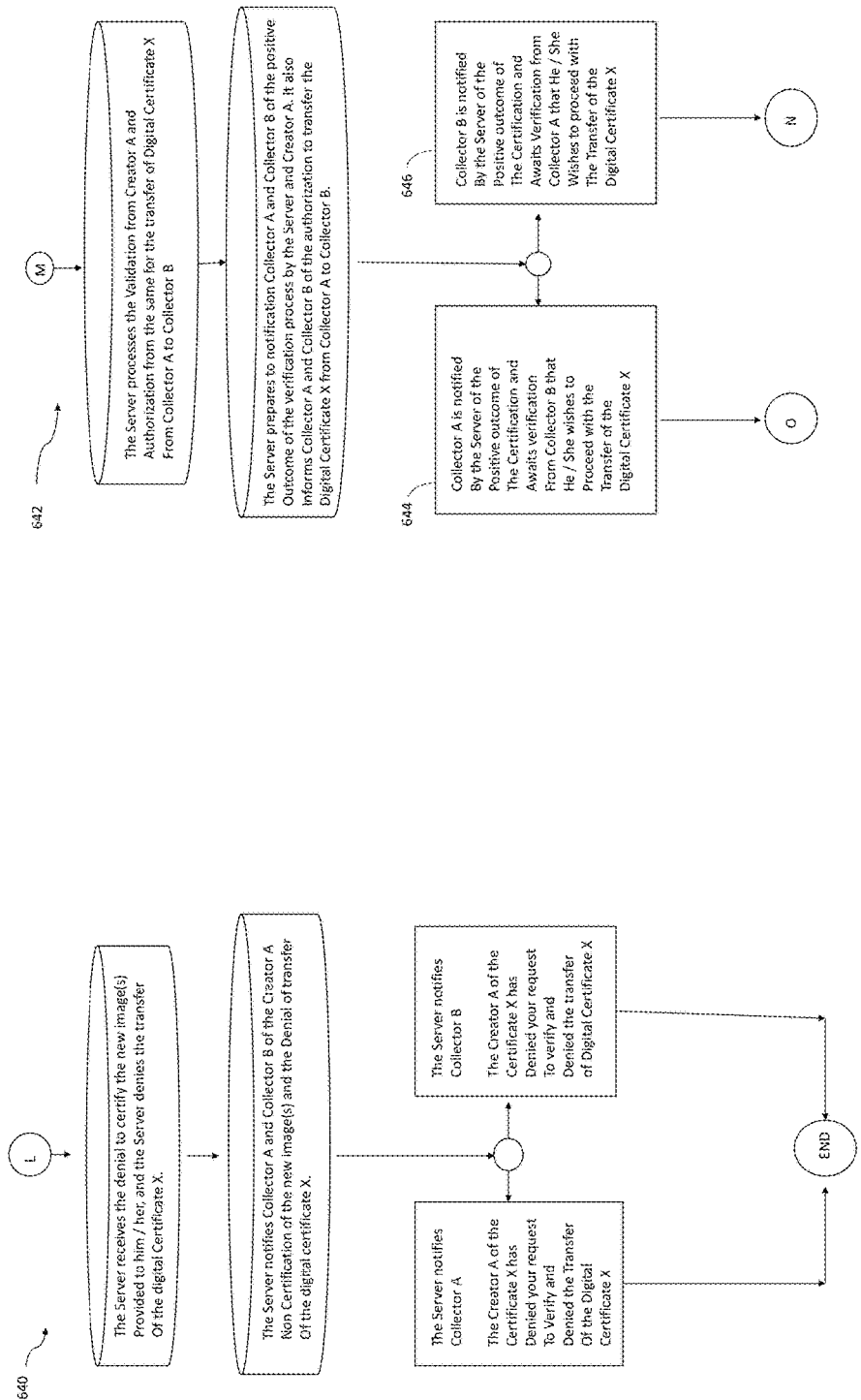

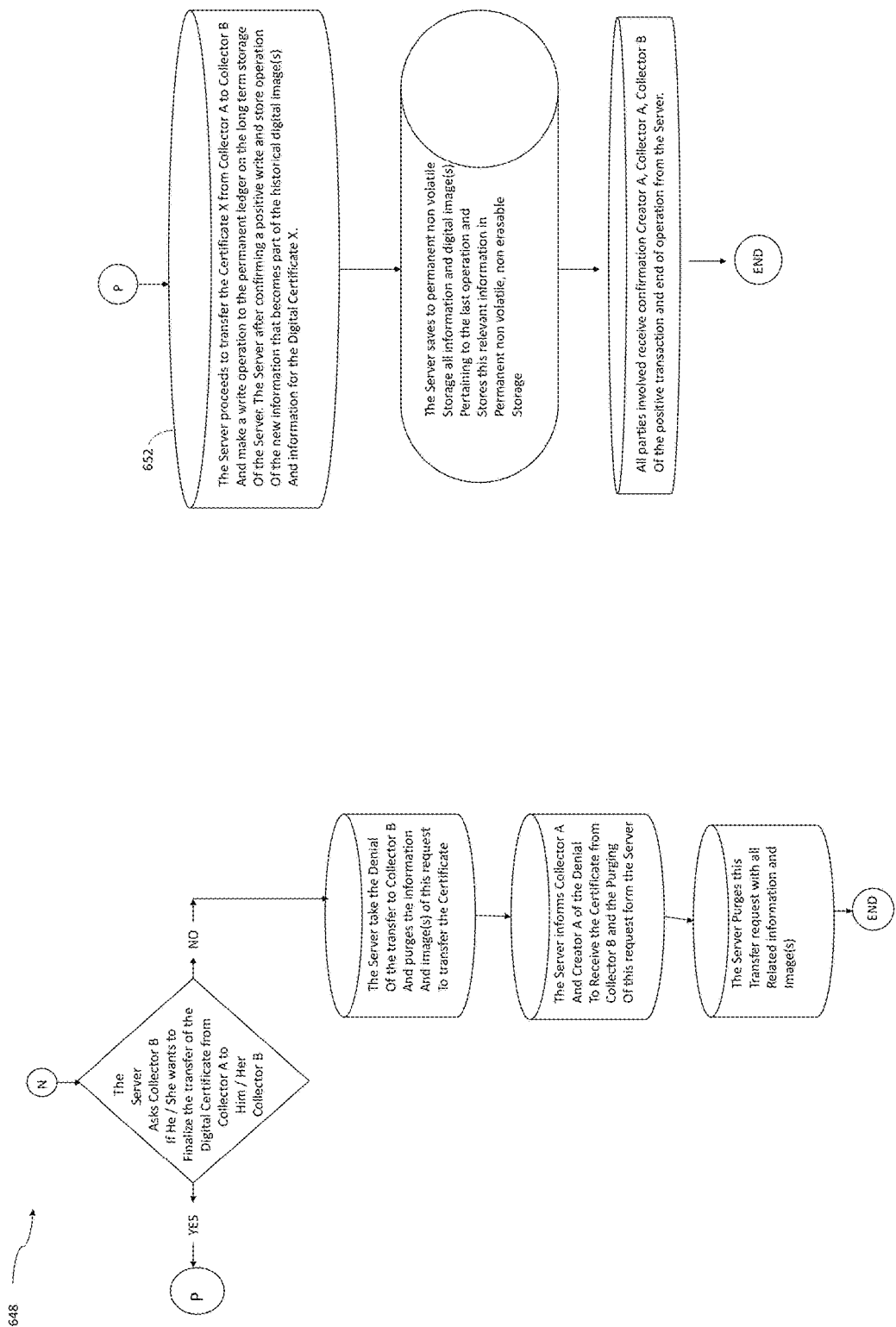

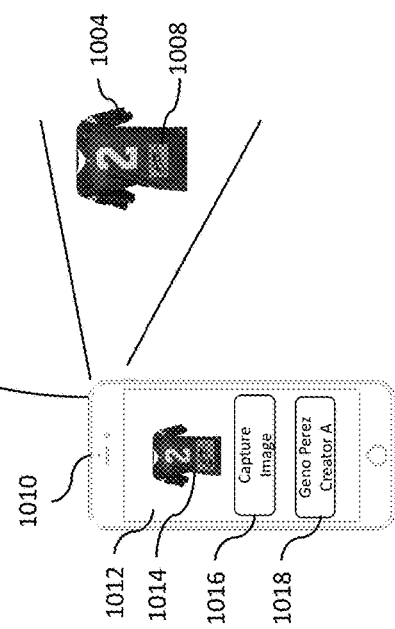
FIG. 10C
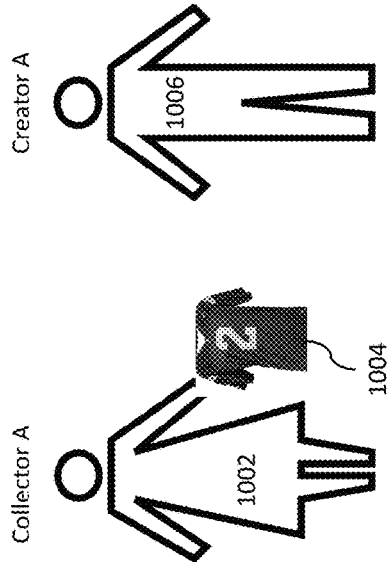
FIG. 10A
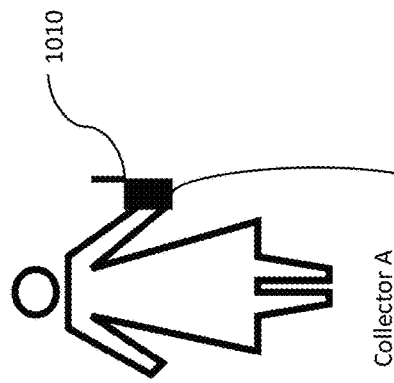
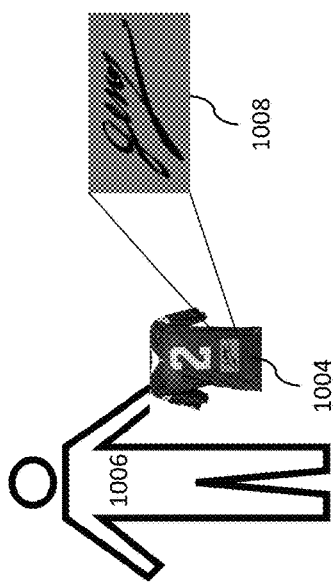
FIG. 10B

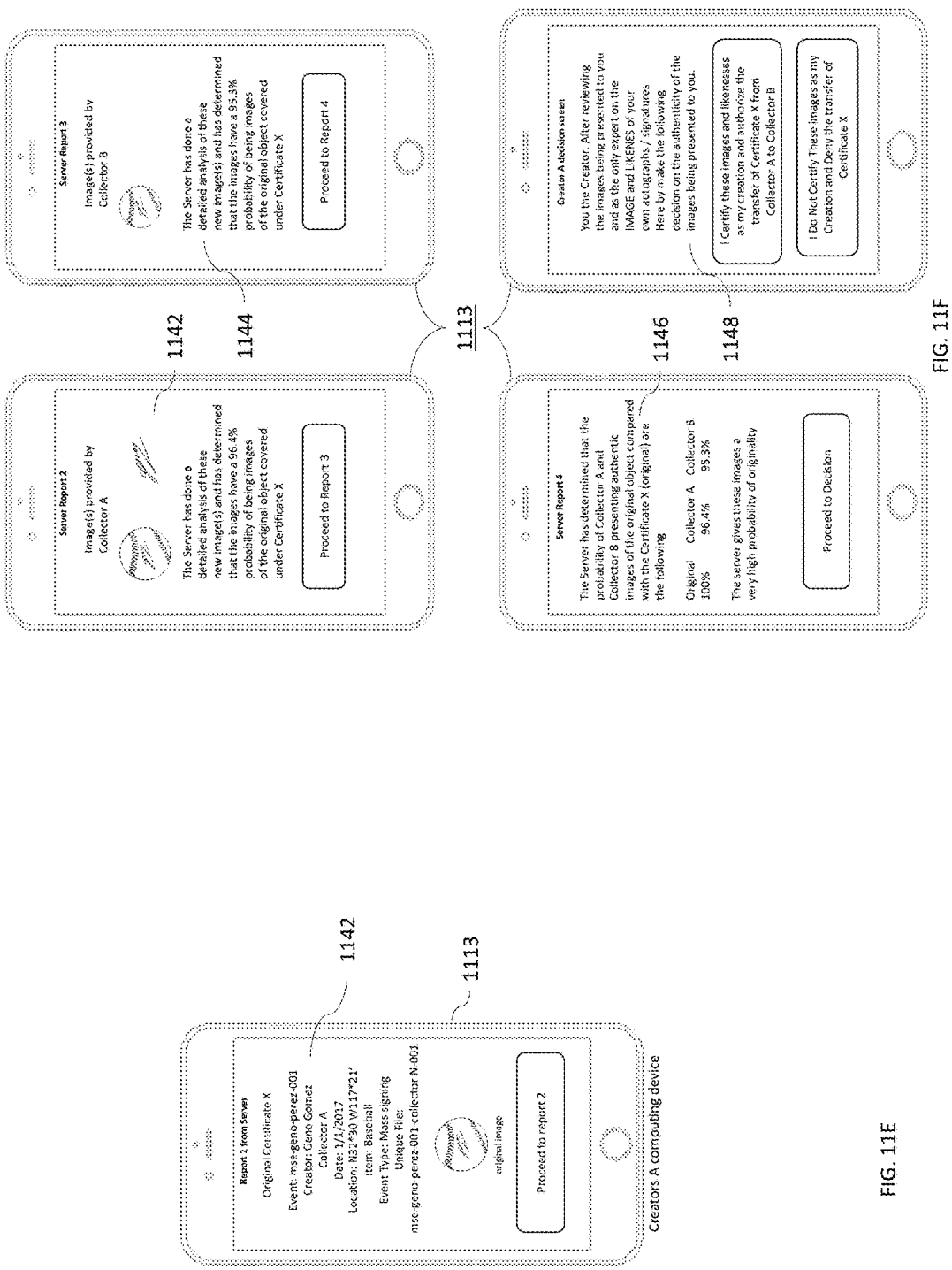

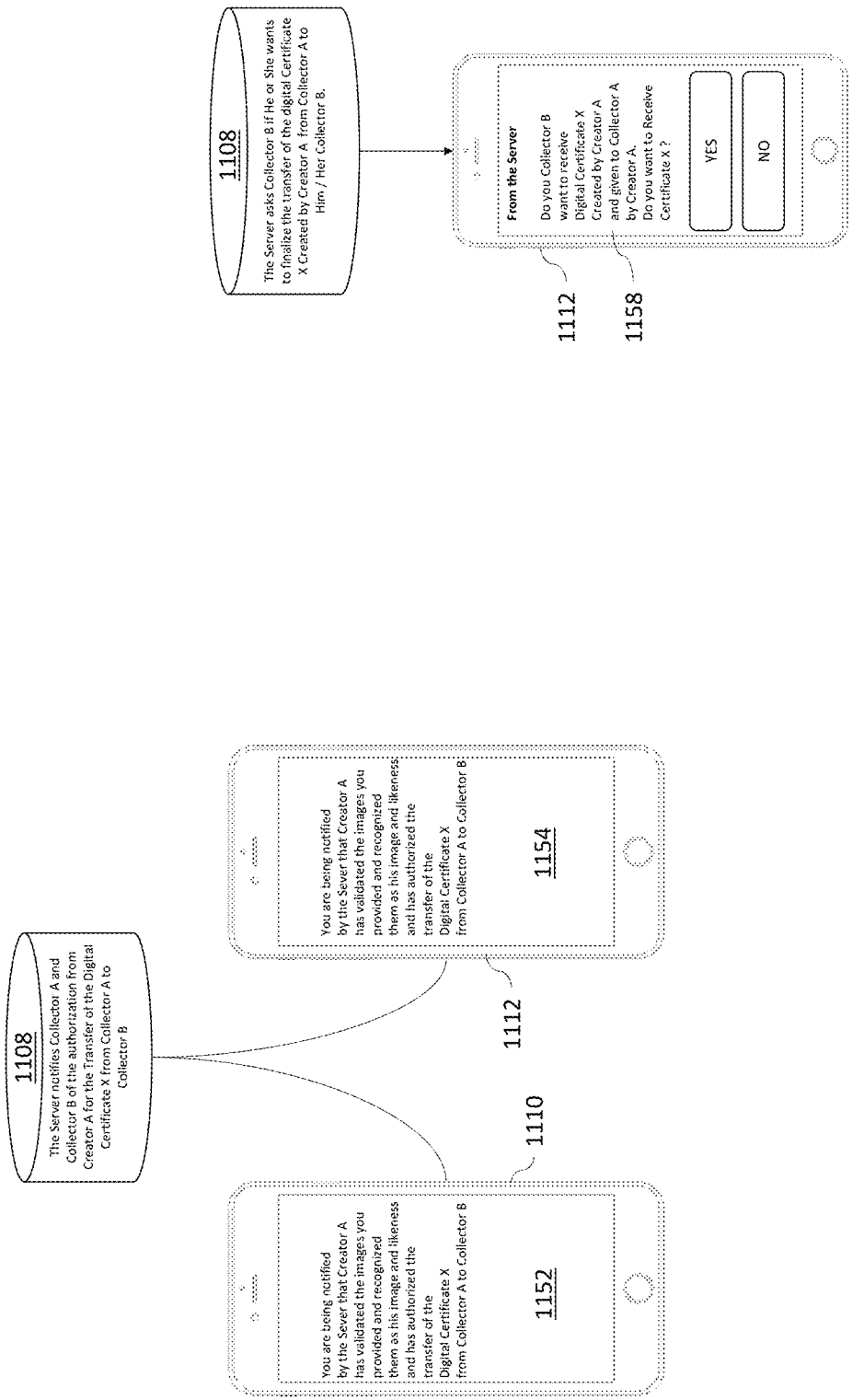

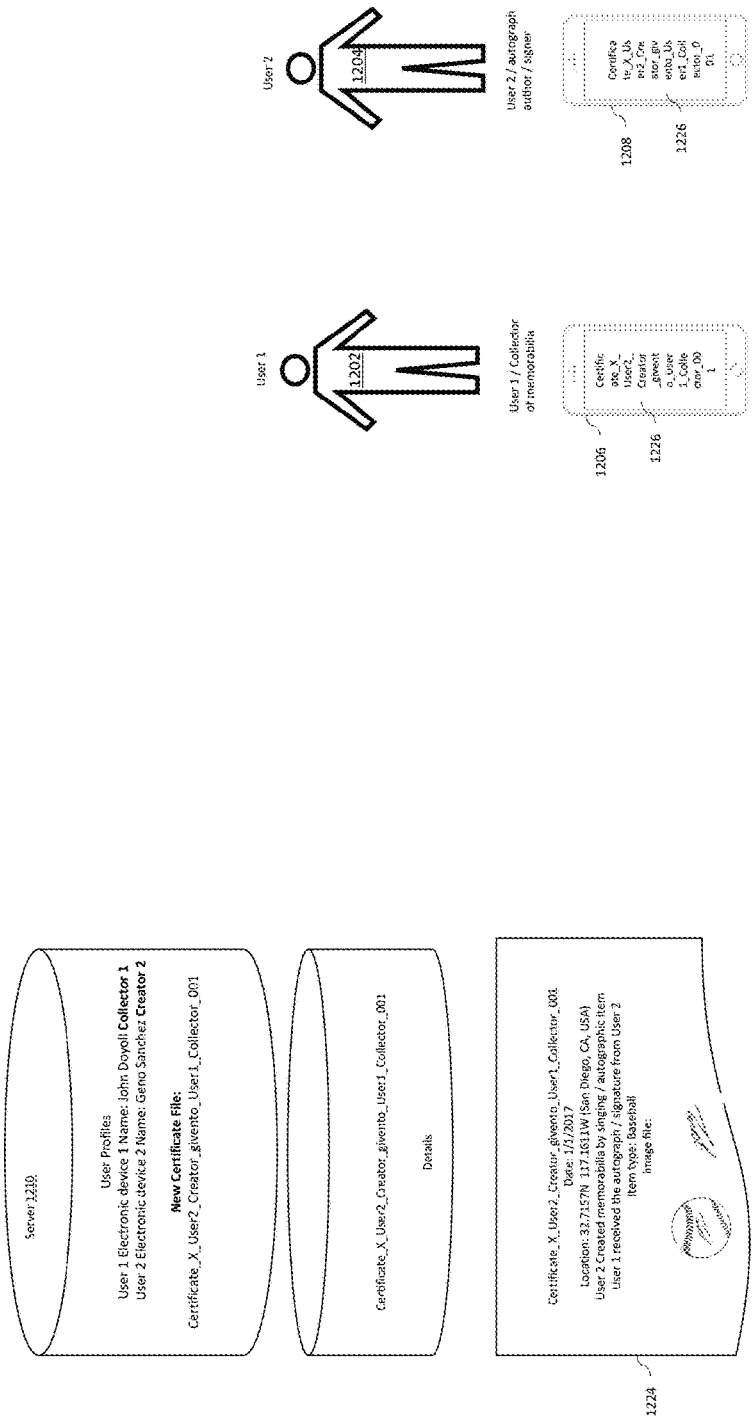

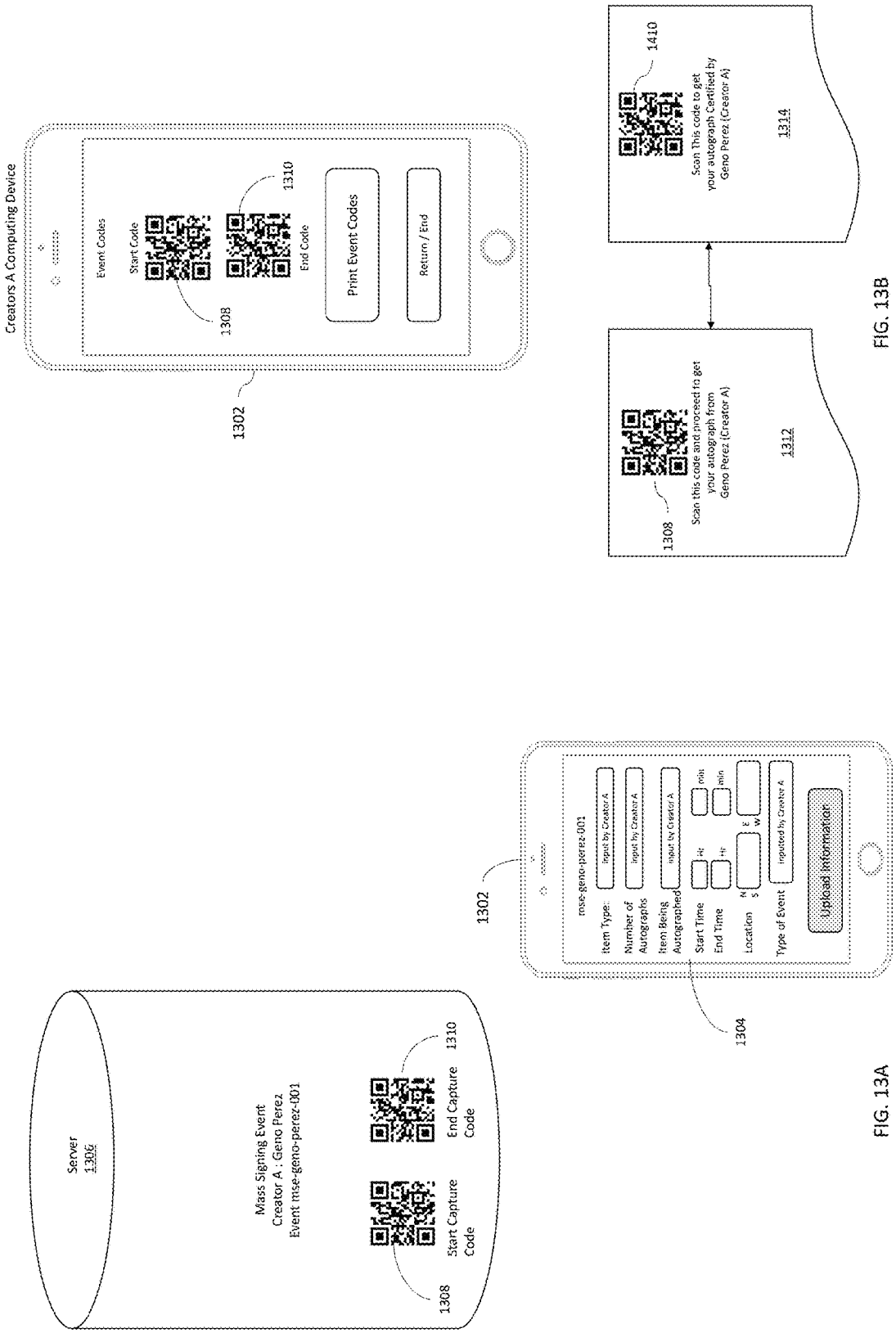

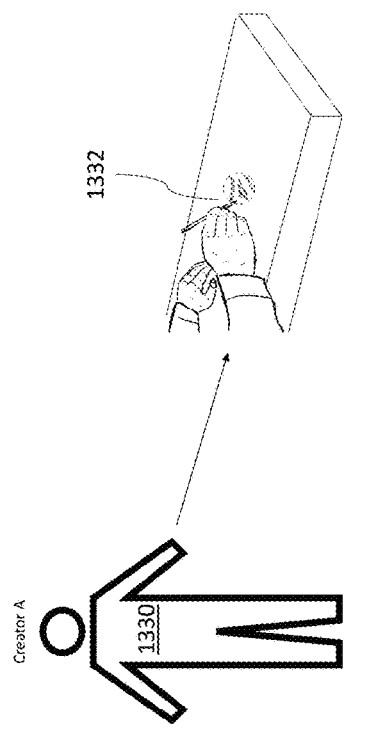
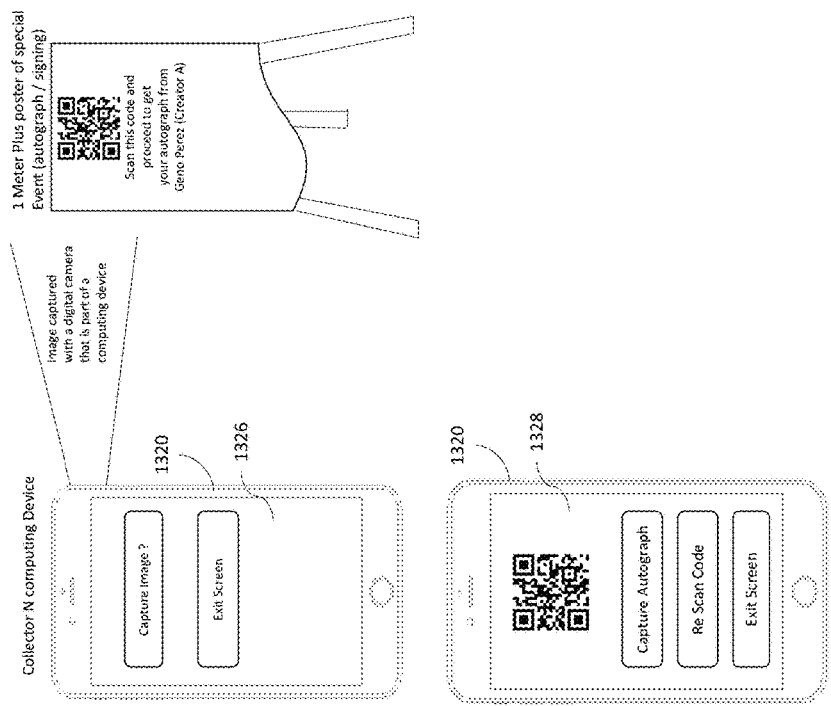
FIG. 13D
FIG. 13C

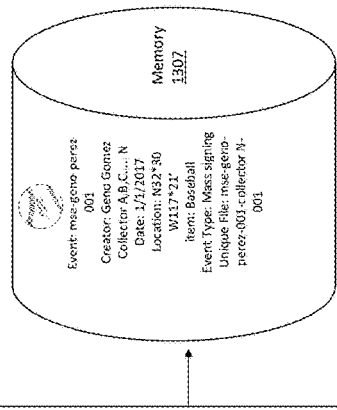
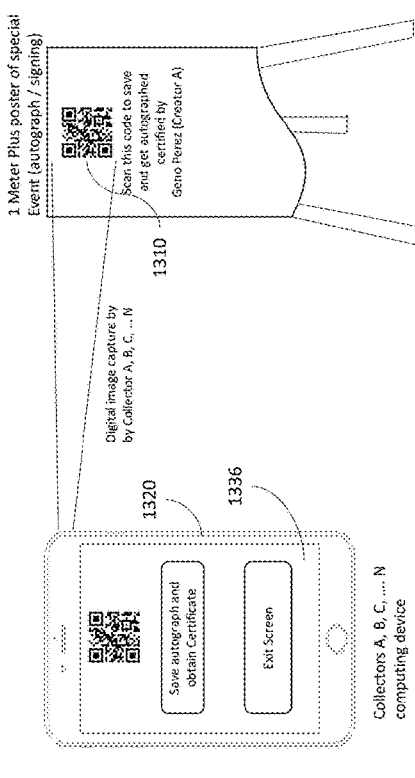
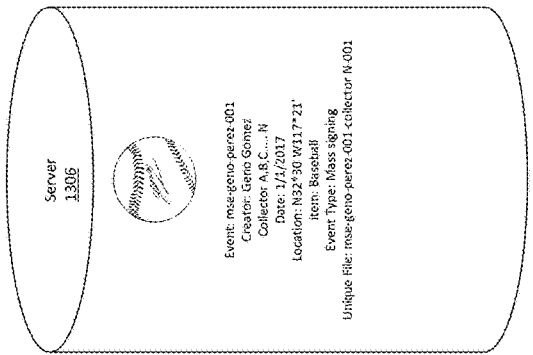
FIG. 13F
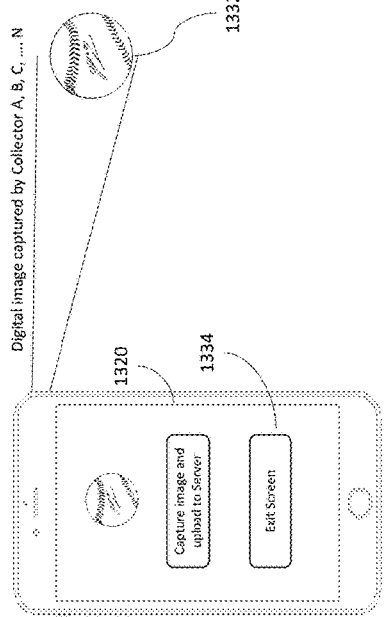
FIG. 13E

ANALYZING DIGITAL IMAGES FOR AUTHENTICATING MEMORABILIA ITEMS

TECHNICAL FIELD

The subject matter described herein relates to computer verification of digitized images of memorabilia items.

BACKGROUND

Counterfeit memorabilia is rife in the memorabilia resale industry. Authentication certificates are typically generated by sales people as a guarantee that they have self-certified a piece of memorabilia as being authentic. When memorabilia is sold from one memorabilia collector to the next, the memorabilia sales people make money, but the person, group, or organization that is the subject of the memorabilia, the memorabilia creator, makes nothing.

SUMMARY

In some aspects, methods, systems and graphical user interfaces are described that are configured to authenticate the creation and the transfer of ownership of items. The items can be memorabilia items. The methods can include, and the systems can be configured to perform, one or more of the following operations.

A first digital image can be received at a server from a first electronic device associated with a first user. The first digital image can be obtained by a camera of a first electronic device associated with the first user. The first digital image can include at least an image of a item. An indication of a location of the first electronic device, associated with the first user, can be received at the server.

The item can have an association with a second user, the second user different from the first user. In some examples, the association can include a mark put on the item by the second user. The mark can include, for example, an autograph, a scratch, damage, embellishment, or the like. The second user can be a memorabilia creator. In some examples, the first user can have a first user profile electronically stored on an authentication server and the second user can have a second user profile electronically stored on the authentication server. The second user can have a second electronic device. The second electronic device can obtain location information associated with the second electronic device and transmit the location information to the server.

A verification that the first location, of the first electronic device, is within a threshold distance from the second location, of the second electronic device, can be performed by the server. In some examples, the server can be a memorabilia authentication server configured to support a platform for creating and managing authentication certificates associated with items.

The first digital image can be transmitted to the second electronic device associated with the second user, the memorabilia creator. The transmitting of the first digital image can be performed in response to verifying that the first location, associated with the first user, is within a predefined threshold distance from the second location, associated with the second user. The verification can be performed by a server, such as a memorabilia verification server.

A verification can be received from the second electronic device. The verification can include an indication that the first digital image includes the item having an association with the second user. The verification can be input by the second user. In some examples, the verification can be input by the second user through a graphical user interface presented on a display device of the second electronic device associated with the second user. The graphical user interface can be configured to allow the second user to increase the size of the first digital image presented within the graphical user interface, rotate the first digital image, or the like.

A record of ownership can be generated. The record of ownership can comprise the first digital image having a digital representation of the item, an indication of the ownership of the item by first user, and an indication of the creation of the item by the second user, or the like. The record of ownership can be generated in response to receipt, at the server, of the verification that the first digital image includes a digital representation of the item having an association with the second user.

The first digital image of the item and the record of ownership can be stored in electronic storage. The electronic storage can be a secure electronic storage and associated with the first user profile. The storing can be performed by a server, such as an authentication server.

The presently described methods can optionally include, and the presently described systems can optionally be configured to perform, one or more of the following operations. A request can be received to transfer ownership of the item from the first user to a third user. The third user can have a third user profile electronically stored on the authentication server. The request can be received from a first electronic device associated with the first user and received at the memorabilia authentication server. In response to the request being received at the memorabilia authentication server, the memorabilia authentication server can cause a graphical user interface to be initiated, on a display of the first electronic device, that includes instructions to obtain a second digital image of the item. The second digital image of the item can be received, at the server, from the first electronic device. The second digital image can be obtained by a camera of the first electronic device.

A first set of pixels can be identified within the first digital image that correspond to the item. In some examples, the first set of pixels can be identified by the first electronic device. In other examples, the second digital image can be transmitted to the server and the server can identify the first set of pixels. In some implementations, the first electronic device can run a software application that includes instructions for identifying items in an image. A second set of pixels within the second digital image can be identified that correspond to the item. In some examples, the second set of pixels can be identified by the first electronic device. In other examples, the second set of pixels can be identified by the server.

A verification that the second set of pixels correspond to the first set of pixels can be performed. The verification can be performed by the memorabilia authentication server. A request to authorize the transfer of ownership of the item from the first user to the third user can be transmitted to an electronic device associated with the second user. The second user can be the memorabilia creator. The request to authorize the transfer of ownership of the item can comprise one or more of the first digital image of the item, the second digital image of the second item, the first set of pixels, the second set of pixels, an analysis of a comparison between the first set of pixels and the second set of pixels, or the like.

A graphical user interface can be initiated on a display of the second electronic device to facilitate interaction with one or more of the first digital image of the item, the second digital image of the second item, the first set of pixels, the second set of pixels, or the like, by the second user. The second user can zoom, slide, rotate, or the like the images presented through the graphical user interface to facilitate identifying and verifying whether the images contain the item and/or the likeness of the second user.

An authorization to transfer the ownership can be received from the second electronic device provided by the second user. The authentication can be received at the memorabilia authentication server. In response to the authentication from the second user, the first digital image of the item and the unique identifier can be stored in electronic memory and associated with the third user profile.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to certain specific software and/or hardware architectures, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIGS. 4A-4C illustrate a process flow of a method having one or more features consistent with the present description;

FIGS. 5A-5D are process flow diagrams for a method having one or more features consistent with the present description;

FIGS. 10A-10G show views of a graphical user interface having one or more features consistent with the presently described subject matter;

FIGS. 11A-11J show views of a graphical user interface having one or more features consistent with the presently described subject matter;

FIGS. 12A-12G show views of a graphical user interface having one or more features consistent with the presently described subject matter; and FIGS. 13A-13F show views of a graphical user interface having one or more features consistent with the presently described subject matter;

DETAILED DESCRIPTION

The presently described subject matter provides for a technical solution to allow creators of memorabilia to authenticate the memorabilia, track ownership of the memorabilia and continue to receive the benefit as the memorabilia moves from one collector to the next. The presently described subject matter also provides for a technical solution to allow collectors of memorabilia to ascertain the authenticity of memorabilia when receiving it from collectors or organizations that are not the creators of the memorabilia. The creation and transfer of items can be managed by a server, such as an memorabilia authentication server. The memorabilia authentication server can provide a platform supporting one or more operations of a memorabilia authentication application system distributed across multiple electronic devices. An initiation of an action by one user of the memorabilia authentication application system can cause the server to trigger actions on one or more electronic devices. For example, a request to transfer ownership of a item between two users can cause the triggering of a notification or an application on an electronic device associated with the creator of that item.

Figure 1:
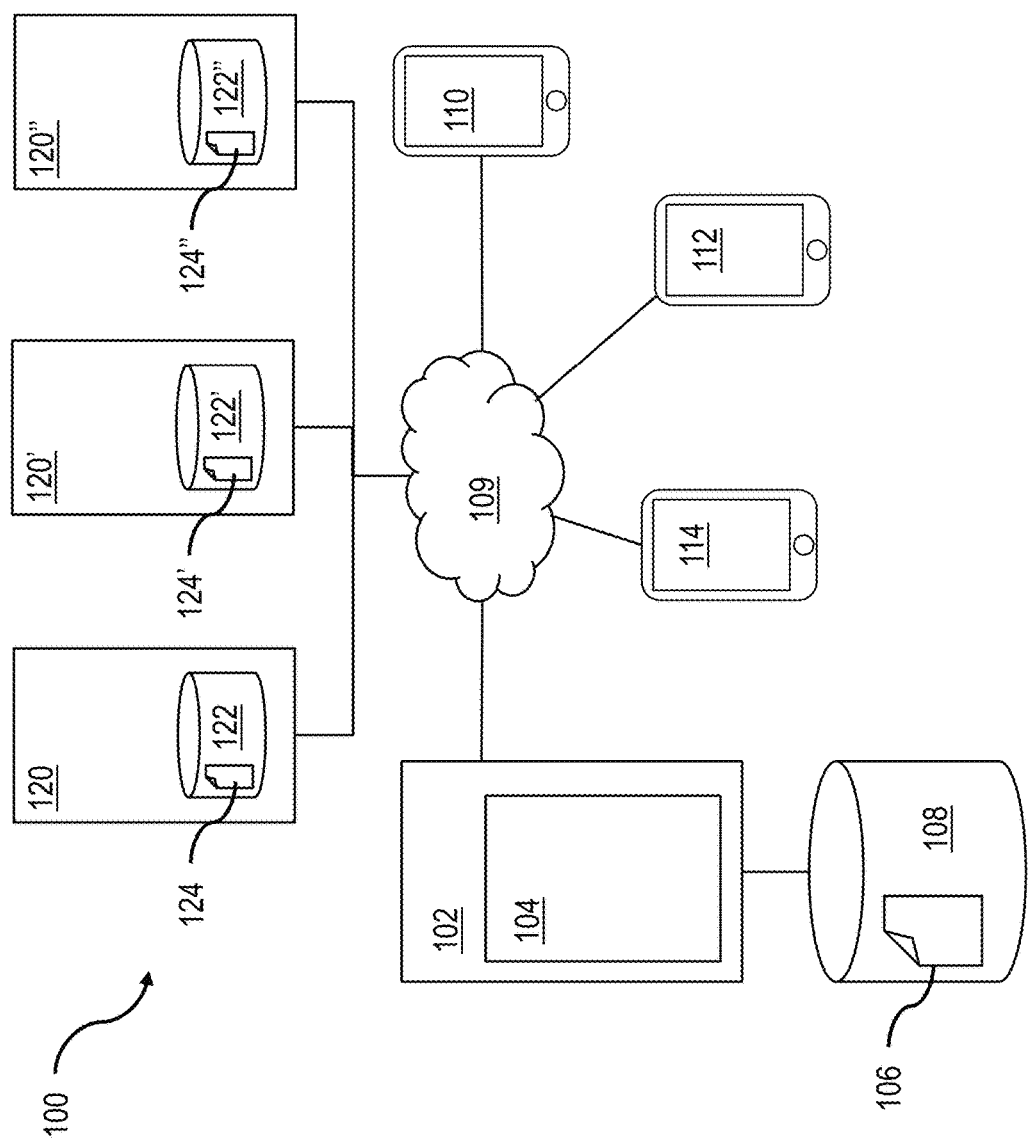
FIG. 1 is an illustration of a system having one or more features consistent with the present description.

FIG. 1 is an illustration of a system 100 having one or more features consistent with the present description. The system 100 can be configured to facilitate authentication, monitoring, and tracking of memorabilia created by a memorabilia creator. The system 100 can include a server(s) 102. The server(s) 102 can comprise one or more processors 104 that are configured to perform one or more operations as described herein.

The system 100 can be configured to facilitate the creation of a certificate verifying the authenticity of an item created by an item creator. For example, a memorabilia item created by a celebrity, sports personality, or the like. The certificate can be referred to herein as a certificate, an authentication certificate, an electronic certificate, a record of ownership, or the like. The authentication certificate can be an electronic certificate 106 stored in electronic memory 108. The electronic certificate 106 can be associated with one or more verification items. The or more verification items can be used, by the server(s) 102, to verify the authenticity of a memorabilia item. The one or more verification items can include an information set about the memorabilia item. The information set about the memorabilia item can include a subject, type, shape, color, size, or the like, of the memorabilia item. The information set can include an indication of one or more characteristics of the memorabilia item, such as an indication of an autograph, a size of the autograph relative to the size of the memorabilia item, a color of the autograph, a message on the memorabilia item, or the like. The one or more verification items can include one or more images of the memorabilia item, one or more videos of the memorabilia item, or the like.

A certificate 106, stored in electronic memory 108, can be at least part of an ownership record for the item. The ownership record for the item can include a record of the title transfer of the item. The verification record can be referred to herein as an ownership record or a record of ownership. The record of ownership can be an entry in a database, a data object in a database, a data file within a storage repository, a table within a database, or the like. The ownership record can include information on every entity that owned the memorabilia item, details of the sales or exchanges of the memorabilia item, or the like. Each entry, or transaction, in the verification record can have a unique identifier. In some examples, the certificate 106 can include one or more of an identity of each prior owner of the memorabilia item, an indication of a location of each transfer of ownership of the memorabilia item, an indication of an amount paid for each transfer of ownership, an indication of the date and/or time of each transfer, or the like.

The ownership record can be stored on multiple electronic memories, such as electronic memory 108, maintained by multiple servers, such as server 102. In some examples, in response to each transaction associated with a verification record and/or certificate 106 of a memorabilia item, a unique transaction identifier can be generated. The unique transaction identifier can be associated with transaction data. The transaction data can include information about the transaction, such as an identity the assignor of a memorabilia item, the identity of the assignee, a location of the transaction, an indication of what was exchanged for the memorabilia item, or the like.

In some variations, a copy of the certificate 106 can be replicated on multiple different servers. For example, servers 120, 120' and 120" can be configured to be in electronic communication with the server 102. In some variations, server 102 may be referred to as a primary server. The primary server 102 can be configured to facilitate the generation of the certificate 106 and manage the certificate 106 as the ownership of the memorabilia items changes. The servers 120, 120' and 120" may be slave servers. The slave servers can be configured to maintain copies 124, 124' and 124" of certificate 106. The copies 124, 124' and 124" can be part of copies of the verification record maintained and managed by server 102. The replication of the certificate 106 on the various servers 102, 124, 124', 124", can be triggered in response to the generation of a certificate 106 on any one of the servers. Similarly, replication of an update to a certificate 106 on the various servers 102, 124, 124', 124", can be triggered in response to the update of a certificate 106 on any one of the servers.

In some variations, any one server 102, 120, 120', and 120" can function as a primary server and any of the other servers can function as a slave server. Which mode, whether in a primary mode or a slave mode, the server will operate in can be determined at the time of a transaction. For example, if server 120' is providing the best quality of service to a mobile device, such as mobile device 110, at the time of a creation of a memorabilia item, the server 120' may act as the primary server. The other servers, servers 102, 120, and 120", may function as slave servers, receiving and maintaining copies of the certificate generated by the server 120'.

Servers 102, 120, 120' and 120" may be disposed at different locations and in electronic communication through a network. For example, through network, 109. In some examples, the network 109 includes the Internet. Occasionally a server may go offline. As such, immediate updating of a verification record associated with a memorabilia item, at that server, may not take place. The system 100 can be configured to cause the verification records maintained by that server to be updated based on the verification records stored on the other servers. Accuracy of the verification record can be maintained during the update by ensuring that more than one server includes the same verification record. Should a verification record at a server be corrupted for some reason, crowd sourcing of the verification records maintained at other servers can be performed. In some variations, the verification record that has the most agreement between servers can be the one that is adopted accurate. In other variations, the verification record that has above a threshold number, or percentage, of servers in agreement, can be adopted as the accurate verification record.

In some variations, the servers 102, 120, 120', and 120" can be at least part of a distributed database. The distributed database can maintain a continuously growing list of ordered records, such as verification records for memorabilia items. Each of the ordered records can include a timestamp and a link to the previous block. Copies of the ordered records can be maintained on each of the servers 102, 120, 120', and 120". A peer-to-peer network and a distributed timestamping server can be implemented to autonomously maintain the copies of the ordered records on each of the servers.

Figure 2A:
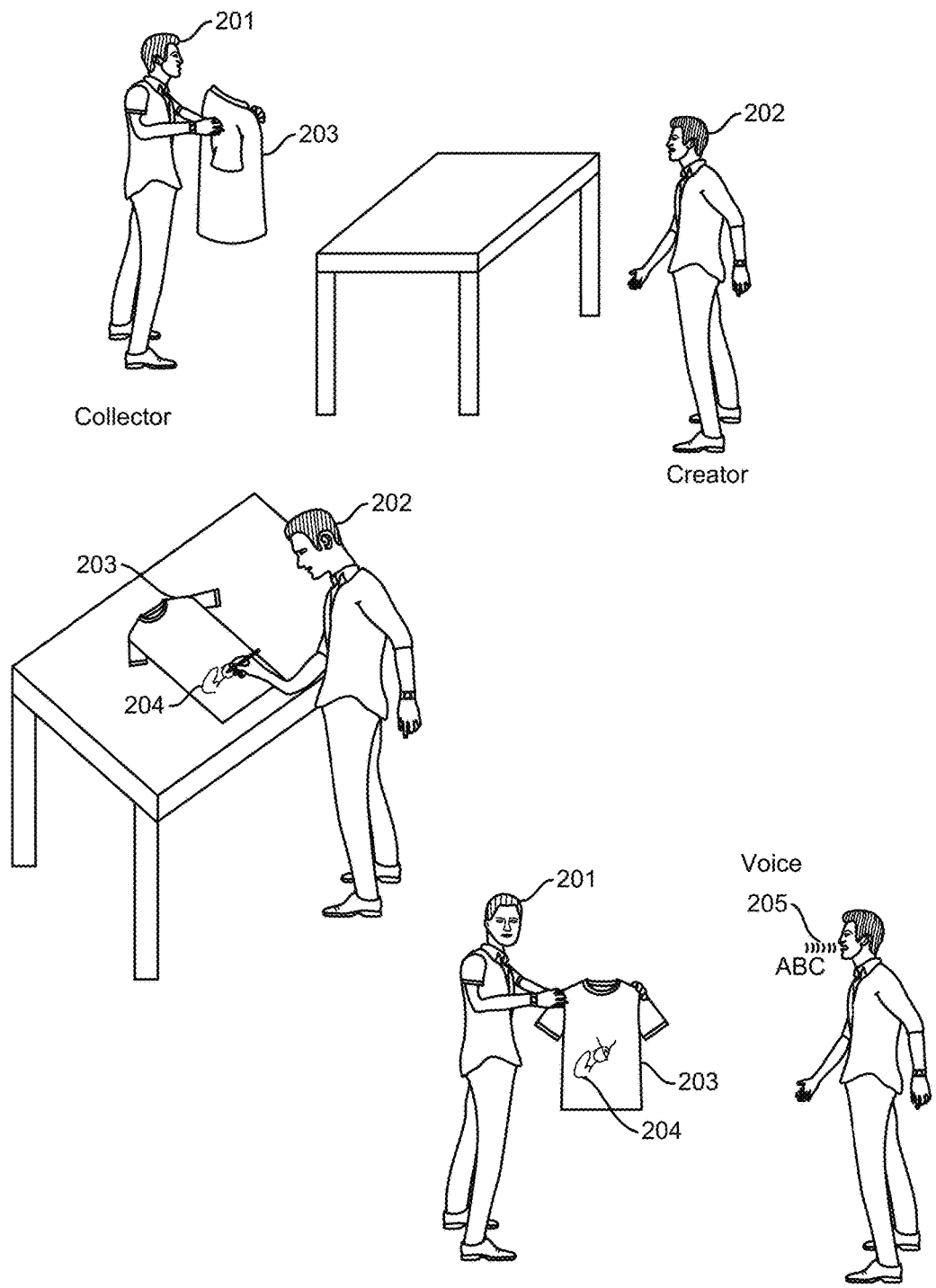
FIGS. 2A-2B illustrate some implementations having one of more features consistent with the present description.
Figure 2B:
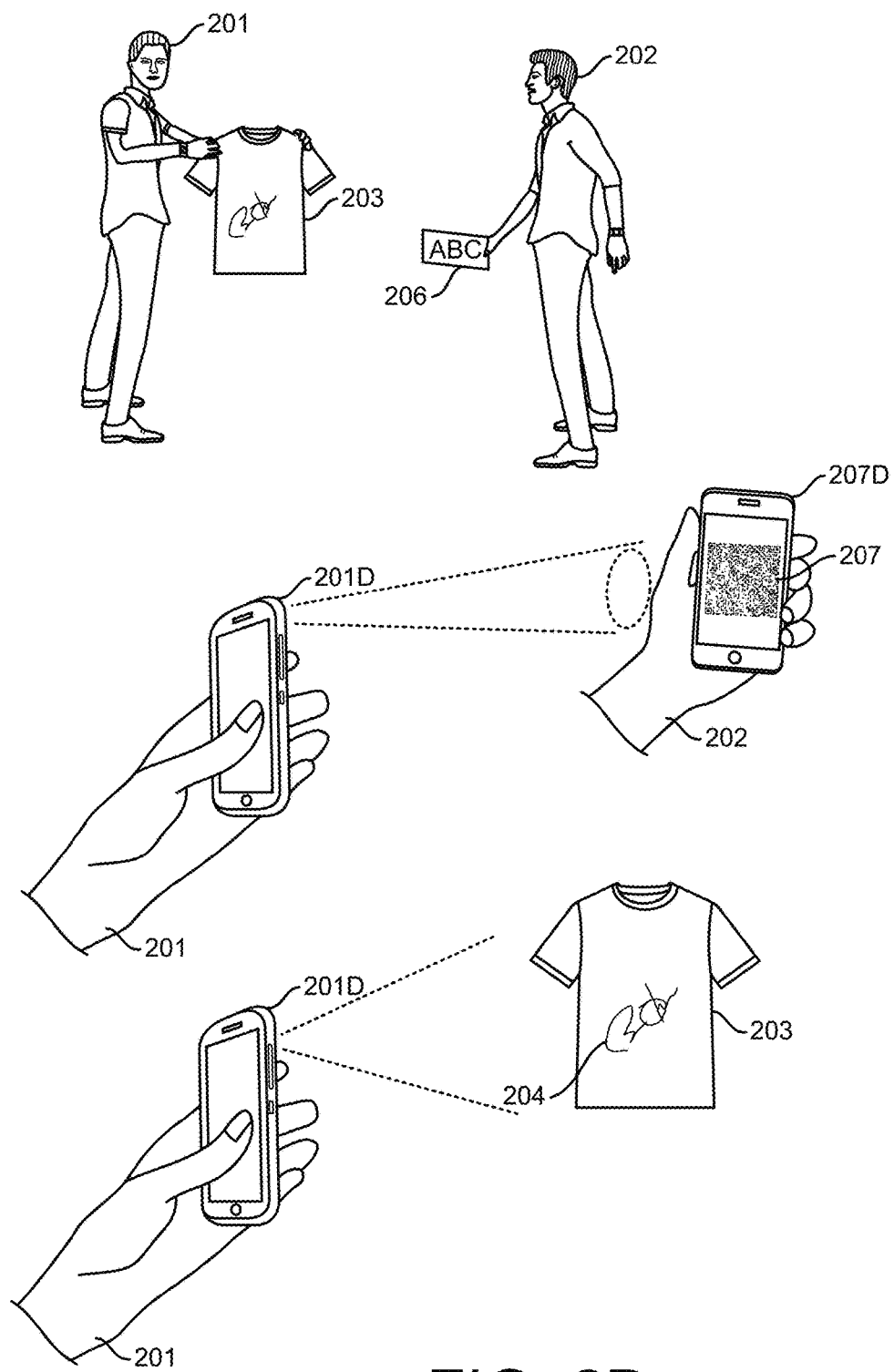
Figure 3A:
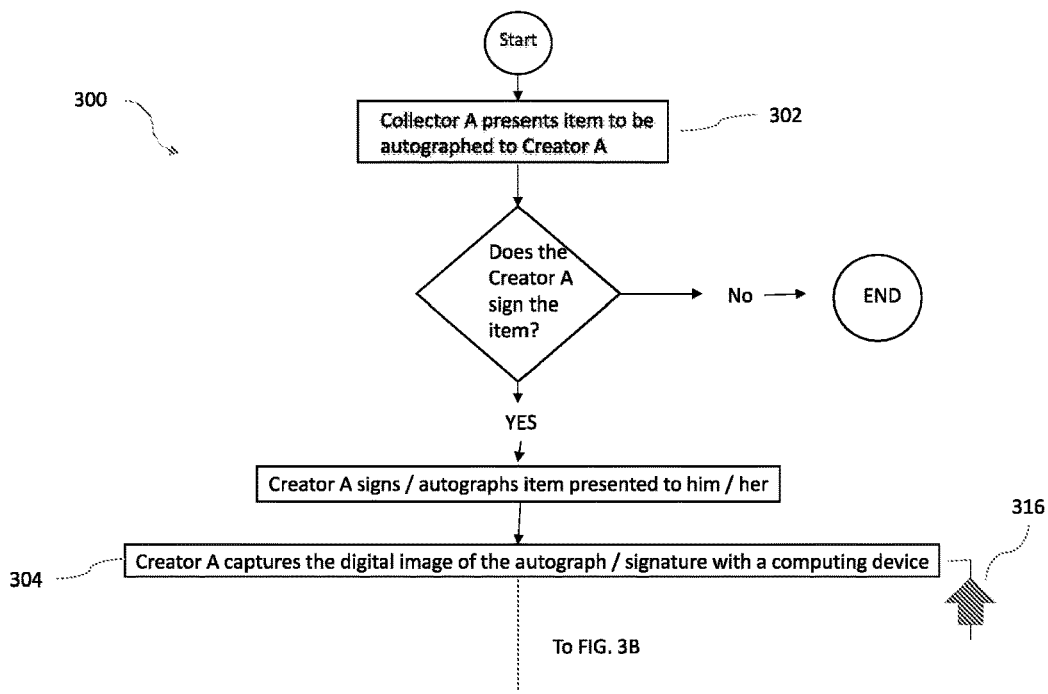
FIGS. 3A-3D illustrate a process flow diagram for a method having one or more features consistent with the present description.
Figure 3B:
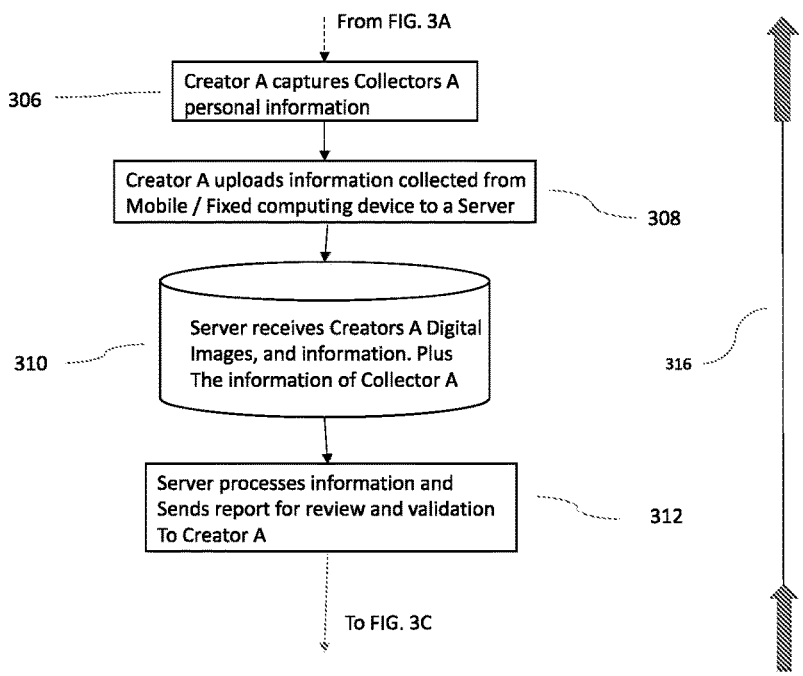
Figure 3C:
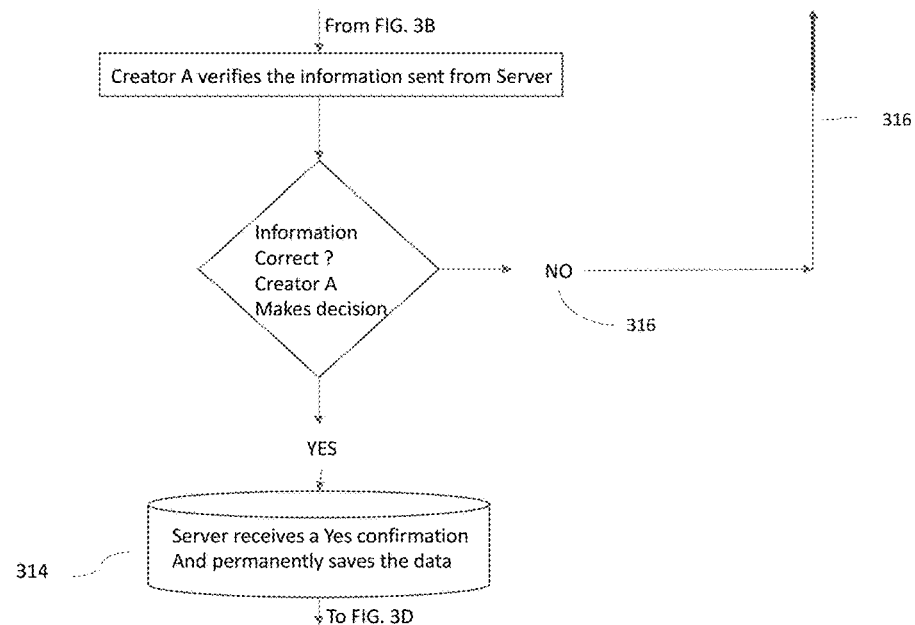
Figure 3D:
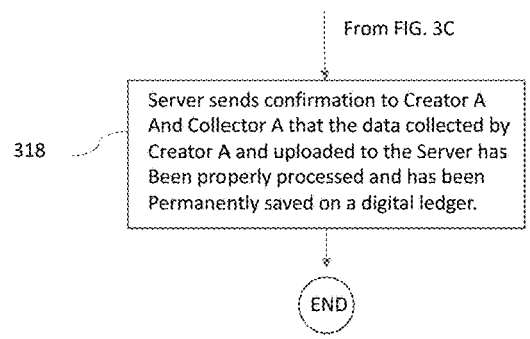

FIGS. 2A and 2B illustrate some implementations having one of more features consistent with the present description. The implementations can include steps by which a memorabilia item can be authenticated. The memorabilia collector 201 and the memorabilia creator 202 can be known to a memorabilia authentication computing system, such as computing system 100 illustrated in FIG. 1. The memorabilia collector may present an item 203 to the memorabilia creator 202 to be marked in some unique manner by the memorabilia creator 202. The memorabilia creator 202 can mark the item 203 in some unique way, for example, by putting their autograph 204 on the item 203.

In some examples, the memorabilia creator 202 can provide a code to the memorabilia collector 201. The code can be associated with the memorabilia creator 202. The code can be provided verbally (as shown by 205), on paper (as shown by 206), in a digital image (as shown by 207), transmitted from a mobile device, or the like. The memorabilia collector 201 can input the code into his or her electronic device, such as electronic device 112, illustrated in FIG. 1. The memorabilia collector 201 can also obtain a digital image of the item 203 with the autograph 204. The electronic device 112 can be configured to upload the digital image and the code to a server, such as server 102. The server 102 can be configured to cross-reference the code with a database of memorabilia creators to identify the memorabilia creator that created the memorabilia item. Based on the code and/or one or more other factors, the digital image of the item 203 with the autograph 204 is sent to the electronic device of the memorabilia creator 202. The memorabilia creator 202 can authenticate the image as of a genuine memorabilia item 205, in which case a memorabilia certificate will be generated. The memorabilia creator can authenticate the memorabilia item through the electronic device associated with the memorabilia creator. If the memorabilia creator 202 does not authenticate the image as being of a genuine memorabilia item 205, then no certificate will be generated. A notification can be sent to the electronic device of the memorabilia collector 201 to notify them of a verification or denial by the memorabilia creator 202.

FIGS. 3A-3D illustrate a process flow diagram for a method 300 having one or more features consistent with the present description. Method 300 can be a method for generating a certificate 106 to be associated with a memorabilia item. Method 300 can be a method for the memorabilia creator to facilitate the generation of a certificate 106 verifying the authenticity of the memorabilia item. In some examples, a memorabilia creator can be a celebrity, sports venue, concert venue, sporting personality, musician, popstar, politician, royalty, or the like.

At 302, a memorabilia collector can present an object to the memorabilia creator to be, for example, autographed by the memorabilia creator. In response to the memorabilia creator autographing the object, the object becomes a memorabilia item and as such can become an object of historical interest. Examples of objects that are typically presented to memorabilia creators include photographs, posters, scripts, books, baseballs, footballs, basketballs, sports attire including jerseys and shorts, baseball caps, head gear, helmets, sweat bands, T-Shirts, sports equipment, hokey sticks, lacrosse sticks, baseball bats, or the like.

In some examples, a downloadable program can be initiated on a computing device, such as a mobile device 110 of the system 100, as illustrated in FIG. 1. The downloadable program can be configured to cause one or more processors of the mobile device 110 to perform one or more operations in furtherance of generating a verification certificate for a memorabilia item. In some examples, the memorabilia creator can initiate the downloadable program. The downloadable program can facilitate capture of one or images, one or more video images, or the like, of the memorabilia item.

At 304, the memorabilia creator can cause the mobile device 110 to capture one or more verification items associated with the memorabilia. For example, the memorabilia creator can use the mobile device 110 to obtain one or more video images of the process by which the memorabilia item was created. The mobile device 110 can be used to capture a video of the memorabilia creator autographing the object to make a memorabilia item. The mobile device 110 can be used to capture an image of the memorabilia item after being autographed by the memorabilia creator. The downloadable program implemented on the mobile device 110 can be configured to prompt the memorabilia creator to input information about the memorabilia item. For example, the memorabilia creator can input an indication of the type of memorabilia item, a size of the memorabilia item, a color of then memorabilia item, or the like.

The mobile device 110 can be associated with a memorabilia creator that is registered with the server 102. The mobile device 110 can be verified as the mobile device 110 associated with the memorabilia creator. In some examples, the downloadable application can cause the mobile device 110 to be assigned a verification token. The verification token can be a unique token that is assigned to the mobile device 110 associated with the memorabilia creator. When the mobile device 110 generates a verification item, the verification item can be associated with the verification token of the mobile device 110. For example, an image of a memorabilia item, taken by a camera on the mobile device 110, can include an indication of the token of the mobile device 110. The indication can be embedded in the image, included in metadata for the image, or the like. By providing a token to the mobile device 110 that is applied to each verification item, the provenance of the verification items can be known and verified as being associated with memorabilia creator.

The mobile computing device 110 can be configured to obtain a location when the memorabilia item is created. The location can be determined based on one or more geolocation signals received at a geolocation sensor of the mobile device 110. The location can be determined based on one or more wireless networks detected by the mobile device 110. The location can be determined based on one or more signals received, by the mobile device 110, from one or more base stations. The location can be entered by the memorabilia creator.

At 306, information about the memorabilia collector can be obtained. In some variations, the information can be entered into a downloadable application on the mobile device 110. The memorabilia creator can enter identifying information of the memorabilia collector. In other variations, the memorabilia collector may have a mobile device 112 with a downloadable application executed on it. The mobile device 112 can be configured to detect the presence of the mobile device 110. The detection can be facilitated through the applications installed on the mobile devices 110 and 112. In response to a prompt from the memorabilia creator input through the mobile device 110, the mobile device 110 may communicate with the mobile device 112 causing the mobile device 112 to prompt the memorabilia collector to input their information.

In some variations, the memorabilia collector may be a registered user of the system 100. The memorabilia collector may have a user identity on the system 100. Information associated with the memorabilia collector may be stored on the server 102. The memorabilia creator can enter the user identity of the memorabilia collector when creating the memorabilia item. In some variations, one or more functions or operations attributed to the memorabilia creator and/or user devices associated with the memorabilia creator can be performed by the memorabilia collector and/or user devices associated with the memorabilia collector.

At 308, the mobile device 110 associated with the memorabilia creator can be configured to communicate with the server 102. The mobile device 110 can be configured to upload the information obtained at 304 and 306. The memorabilia creator can be registered with the server 102. The memorabilia creator can have a memorabilia creator identity at the server 102.

At 310, in response to receipt of the information from the mobile device 110 associated with the memorabilia creator, the server 102 can be configured to generate a verification certificate 106 for the memorabilia item. The verification certificate 106 can be associated with one or more items of information associated with the memorabilia item, the memorabilia creator and the memorabilia collector.

At 312, the server 102 can be configured to send the verification certificate 106 and/or information associated with the verification certificate 106 to the mobile device 110 associated with the memorabilia creator. The mobile device 110 can be configured to present the verification certificate 106 and/or the information associated with the verification certificate 106 to the memorabilia creator. The mobile device 110 of the memorabilia creator can be configured to prompt the memorabilia creator to review and verify that the information on the certificate 106 is correct.

In response to an indication that there is an error in the information, the mobile device 110 can be configured to prompt the memorabilia creator to correct the information.

At 314, in response to the memorabilia creator verifying the information, the mobile device 110 can be configured to send a signal to the server 102 indicating that the memorabilia creator has verified the information. In response to receiving the signal indicating that the memorabilia creator has verified the information, the server 102 can be configured to make a permanent record of the verification certificate 106. The verification certificate 106 can be stored in non-volatile memory. In some variations, the verification certificate 106 can be stored on multiple data ledgers. For example, the verification certificate 106 can be stored as part of a blockchain of memorabilia transactions.

The server 102 can be configured to send a signal to the mobile device 110 associated with the memorabilia creator and/or the mobile device 112 associated with the memorabilia collector, indicating that the verification certificate 106 has been saved by the server 102.

Figure 4C:
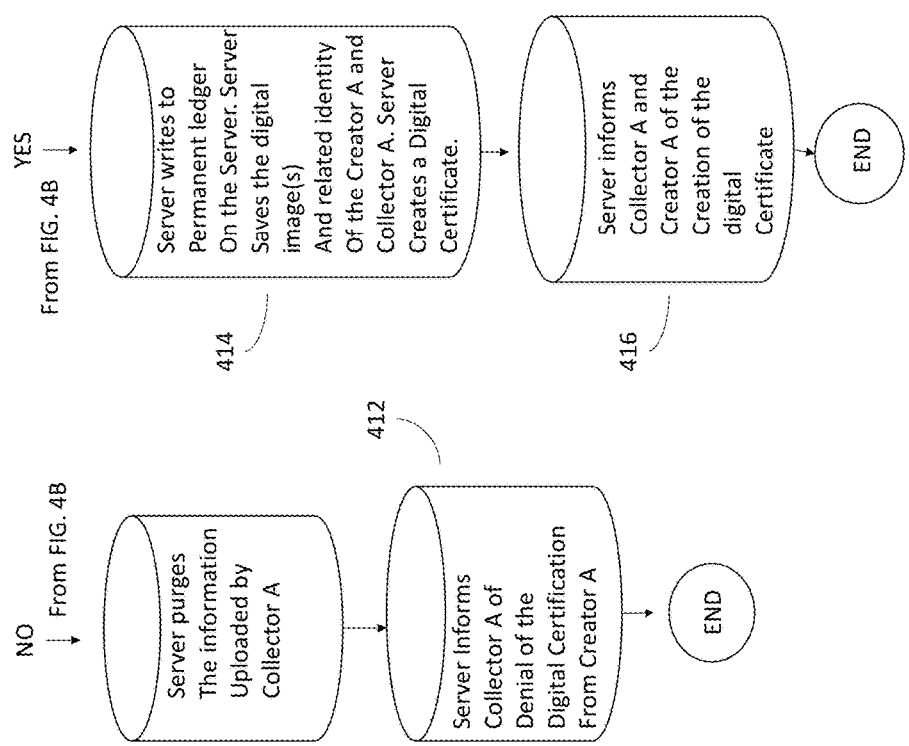

FIGS. 4A-4C illustrate a process flow of a method 400 having one or more features consistent with the present description. Method 400 can facilitate the generation of a memorabilia item by a memorabilia collector that is verified by the memorabilia creator.

At 402, an object can be autographed by a memorabilia creator to form a memorabilia item. The memorabilia item can be owned by a memorabilia collector.

At 404, the memorabilia collector can obtain one or more validating images and/or video images of the memorabilia item. The one or more validating images can be configured to facilitate verification of the memorabilia item(s). The one or more validating images and/or video images can be obtained by the mobile device 112 associated with the memorabilia collector. The memorabilia collector may be a registered user of the server 102 and have a user identity maintained by the server 102. The mobile device 112 may have a token associated with it. The token may have been generated by the server 102 and provided to the mobile device 112. The token can be a fixed code that can be affixed to the one or more verification items, obtained by the mobile device 112, of the memorabilia items. The memorabilia item may be an object that has been autographed, signed, modified, or the like, by a memorabilia creator.

One or more pixels of the digital image can be coded, by the mobile device 112, based on the token associated with the mobile device 112. The coded pixels can be dispersed throughout the digital image in a defined pattern. Encoding the pixels of a digital image can facilitate detection of manipulation of the digital image. For example, a series of pixels may be modified to have a particular coding. The series of pixels may be given a pattern. The pattern may include a pattern template modified by the token associated with the individual mobile device 112. When analyzing the digital image, the pattern can be looked for. If the pattern cannot be found, then it can indicate that the digital image has been tampered with.

At 406, the one or more validating images and/or video images can be provided, from the mobile device 112 of the memorabilia collector, to the server 102. The server 102 can be configured to validate the credentials of the memorabilia collector. The memorabilia collector can input, through the mobile device 112, an identity of the memorabilia creator associated with the memorabilia item shown in the one or more validating images and/or video images.

At 408, the server 102 can be configured to transmit the one or more validating images and/or video images to the mobile device 110 associated with the memorabilia creator.

At 410, the downloaded application on the mobile device 110 can be configured to request verification, from the memorabilia creator, that the one or more validating images and/or video images show the memorabilia item that the memorabilia creator autographed, wrote on, authorized, or the like. The downloaded application can be configured to request verification and/or input of certain information about the memorabilia item, for example, was the memorabilia item autographed, was a message included, the details of any message that was included, a location of the signature, a significance of the memorabilia item (for example, the memorabilia item being a football used in a particular Super Bowl), a location of the creation of the memorabilia item, or the like.

When the memorabilia collector and the memorabilia creator are performing this verification at the time of the memorabilia creation, location information associated with the verification image(s) and/or video image(s) obtained by the mobile device 112 associated with the memorabilia collector can be obtained. Similarly, location information associated with the mobile device 110 of the memorabilia creator can be obtained. The location information from both mobile devices 110 and 112 can be compared to verify that both mobile devices are at the same location.

At 412, if the memorabilia creator denies that the verification image(s) and/or verification video image(s) show a valid memorabilia item, the server 102 can be configured to send a notification to the memorabilia collector through the mobile device 112 associated with the memorabilia collector. The request to generate a verification certificate for a memorabilia item can be purged from the server 102.

At 414, if the memorabilia creator verifies the verification image(s) and/or verification video image(s) do show a valid memorabilia item, the server 102 can be configured to generate a verification certificate 106 for the memorabilia item. The verification certificate 106 can be written to a permanent ledger. There may be a plurality of permanent ledgers associated with a plurality of servers. The verification certificate 106 can be written to each permanent ledger. Therefore, if one permanent ledger is tampered with or fails, the other permanent ledgers will maintain a true record of the verification certificate 106.

At 416, the server 102 can be configured to notify the memorabilia collector, through the mobile device 112, and the memorabilia creator, through the mobile device 110, that a verification certificate 106 has been generated by the server 102.

FIGS. 5A-5D are process flow diagrams for a method 500 having one or more features consistent with the present description. Method 500 can be configured to facilitate the mass generation of memorabilia items. A mass generation of memorabilia items can be at a concert, a convention, when a stadium is being demolished or renovated, or the like.

At 502, a verified memorabilia creator can initiate a mass signing event. The mass signing event can be established on server 102. A mass signing event established on server 102 can configure server 102 to capture the creation of multiple memorabilia items by the memorabilia creator. Mass signing events typically have a continuous flow of autographs being provided by the memorabilia creator to many memorabilia collectors. The server 102 can be configured to capture each of these memorabilia item creations in a permanent ledger.

At 504, information about the mass memorabilia item creation event can be provided to the server 102. The provided information can control the flow of memorabilia items being captured and certified as the image and/or likeness of the memorabilia creator. The information about the event can include a location of event, a date and/or time of event, a number of memorabilia items to be created, a duration of the event, an identity of the objects being turned into memorabilia items, the source of the object (collector or creator provided), or the like.

At 506, in response to receiving the information about the mass memorabilia item creation event, the server 102 can be configured to generate and provide one or more start codes and one or more end codes for the mass memorabilia item creation event.

At 508, the memorabilia creator can generate a code, for example a 1D barcode, 2D barcode, 3D barcode, audible code, alphanumeric code, or the like. The code can be scanned by each memorabilia collector that received a memorabilia item created at the mass memorabilia item creation event. Each collector may be required to download an application onto a mobile device, such as mobile device 112. The application can be configured to facilitate capture of the code through a camera of the mobile device 112. The code can be presented on a screen in the vicinity of the memorabilia creator, printed on boards, or the like.

At 510, the server 102 can receive a request from the memorabilia creator to start the mass memorabilia creation event. The memorabilia creator can provide the start code to the server 102 to initiate the mass memorabilia creation event. The server 102 determines whether it should start the mass memorabilia creation event. The server 102 can be configured to verify the information provided at 404. For example, if the memorabilia creator has provided a start code during an incorrect time, or the mobile device 110 associated with the memorabilia creator is in an incorrect location, the server 102 will not start the mass memorabilia creation event.

At 512, a memorabilia collector may scan a code displayed at the mass memorabilia creation event. The code can be scanned using a camera of a mobile device 112 of the memorabilia collector. In response to a code being scanned the server 102 can be notified, by the mobile device 112, of the memorabilia collector, that the mobile device 112 will obtain a memorabilia item from the memorabilia creator. The server 102 can generate a verification record having a unique identifier and associated with the memorabilia collector.

At 514, the memorabilia collector can obtain a digital image of the memorabilia item in response to the memorabilia item provided to the memorabilia collector by the memorabilia creator. The digital image can be obtained by a camera of the mobile device 112 associated with the memorabilia collector. The mobile device 112 can include a unique token. The unique token can be used to generate a unique coding for attaching to the digital image obtained by the camera of the mobile device 112. The unique coding can be embedded in metadata, embedded in one or more data sections associated with individual pixels of the digital image, or the like.

At 516, upon receipt of the digital image and/or the an indication that the mobile device 112 has scanned the code, the server 102 can generate a verification record. The verification record can include a certificate 106, one or more digital images of the memorabilia item, an identity of the owner of the memorabilia item, an identity of the creator of the memorabilia item, or the like.

At 518, in some variations, the memorabilia collector can scan a second barcode with a camera of the mobile device 112, associated with the memorabilia collector, to signify that they have entered all the information necessary. The second barcode can also prevent the memorabilia collector from obtaining multiple memorabilia items during the mass memorabilia item creation event.

At 520, the server 102 can save the verification record for the memorabilia items to permanent memory 108. In some variations, there are multiple servers 102 configured to save multiple copies of the verification record. The verification record can include the memorabilia creator's identity, the memorabilia collector's identity, one or more images of the memorabilia item, a location of the event, a time of event, or the like.

At 522, the server 102 can be configured to send a confirmation message to the mobile device 110 associated with the memorabilia creator and the mobile device 112 associated with the memorabilia collector. The confirmation message can include an indication that the server 102 has saved the verification record associated with the memorabilia item created at the mass memorabilia creation event. The server 102 can provide an indication of a failure to save the verification record.

Figure 6C:
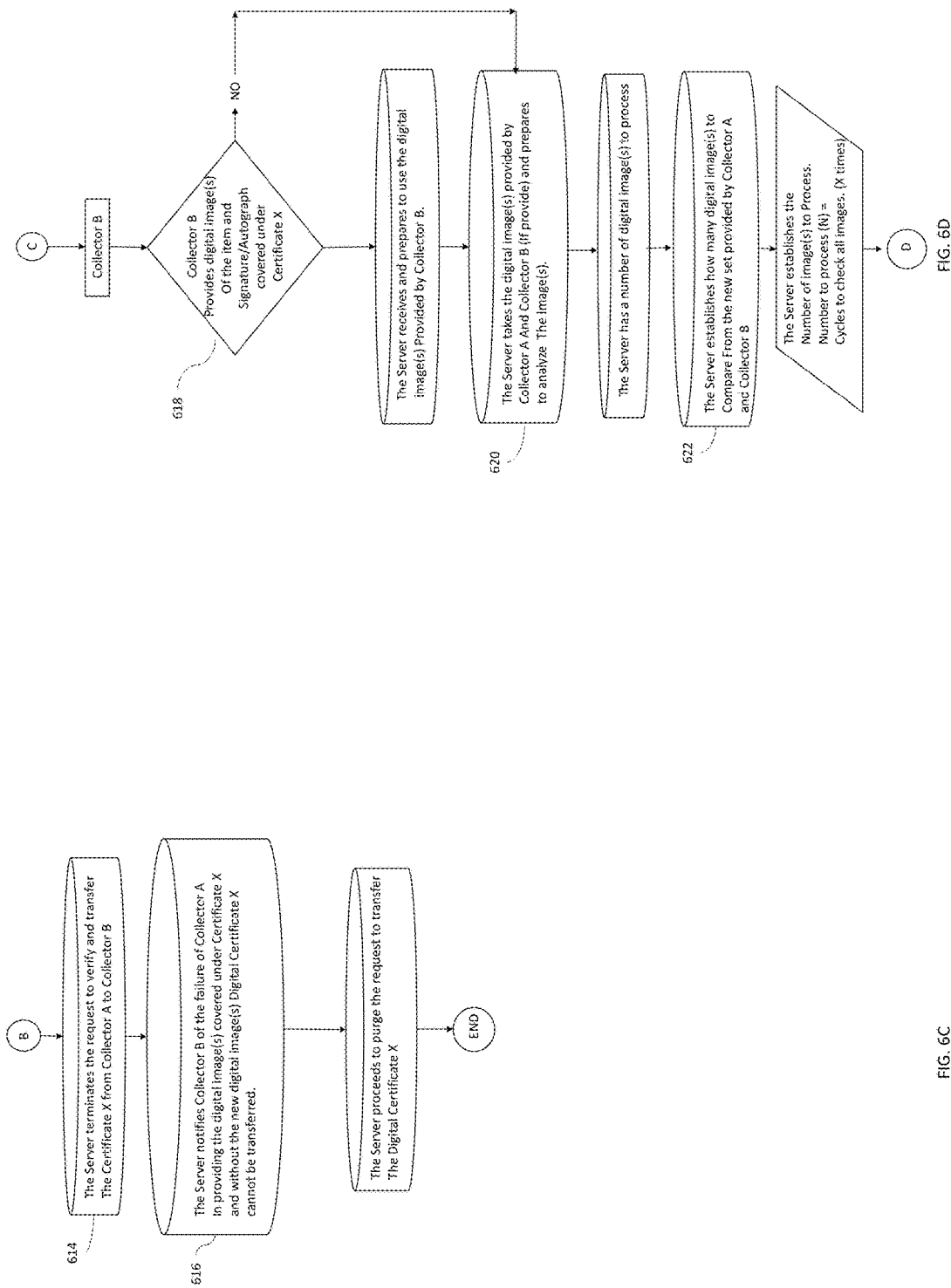
FIGS. 6A-6N illustrate a process flow diagram for a method having one or more features consistent with the present description.
Figure 6F:
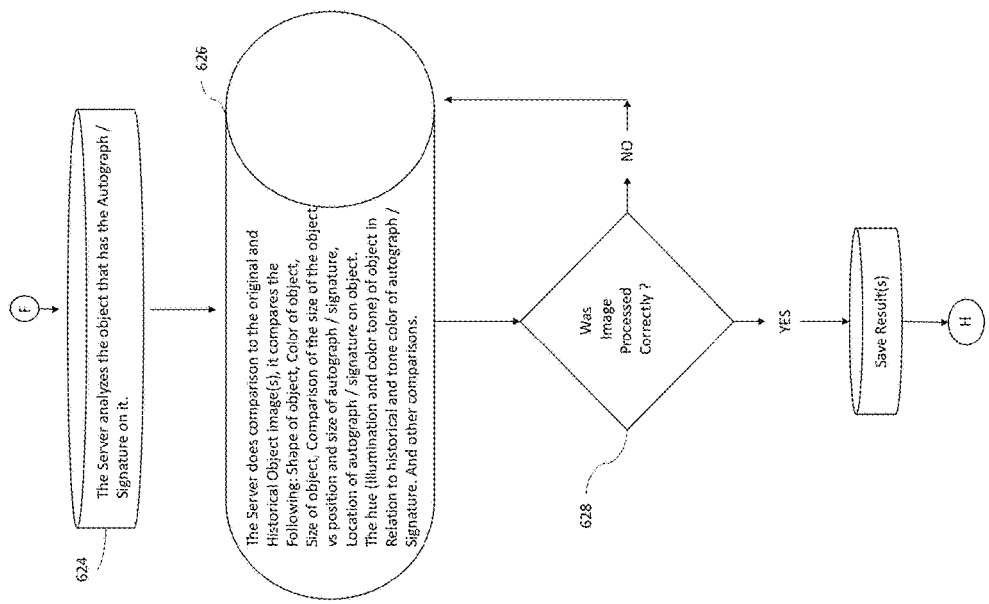
Figure 6E:
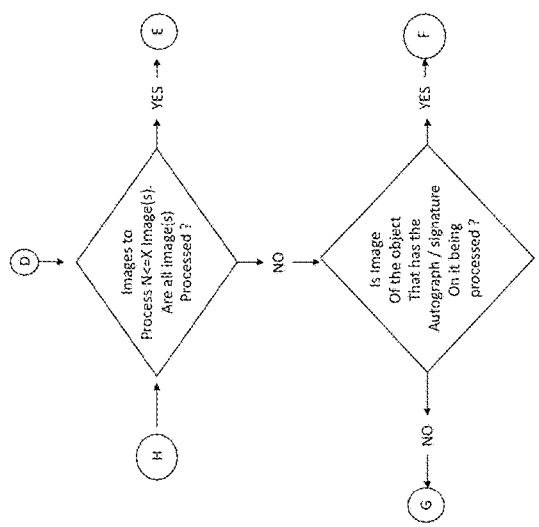
Figure 6H:
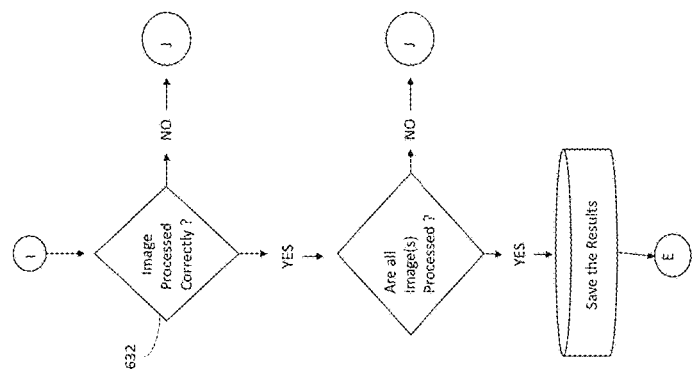
Figure 6G:
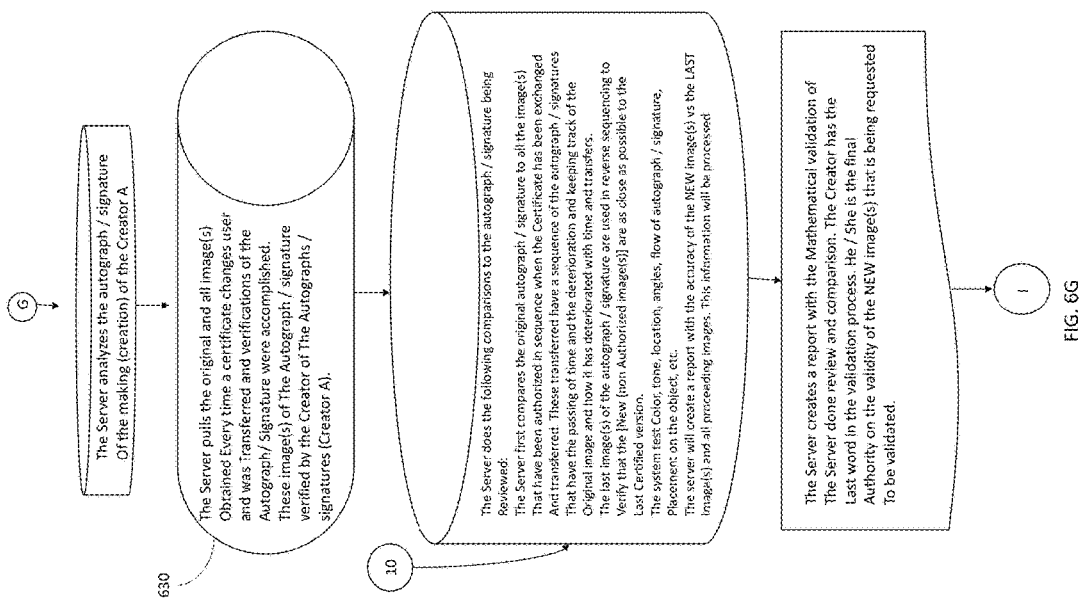

FIGS. 6A-6N illustrate a process flow diagram for a method 600 having one or more features consistent with the present description. The method 600 can be performed by one or more computing devices to facilitate the transfer of ownership of memorabilia items having verification records maintained by a server, such as server 102.

The server 102 can be configured to store one or more verification records for one or more memorabilia items. The verification record of a memorabilia item can include a verification certificate 106. The verification certificate 106 can be a record of authenticity for the memorabilia item and can be used as an instrument to transfer ownership of the memorabilia item.

When a first memorabilia collector desires to transfer a memorabilia item to a second memorabilia collector, the first memorabilia collector can initiate a transfer of the memorabilia item. For example, at 602, the first memorabilia collector can initiate a transfer of the memorabilia item using a downloaded application on a mobile device 112 associated with the first memorabilia collector. The initiation can include an entry and/or selection, by the first memorabilia collector, of an identity of the second memorabilia collector. The initiation can include an entry and/or selection, by the first memorabilia collector, of an identity of the verification certificate associated with the memorabilia item to be transferred to the second memorabilia collector. The server 102 can maintain memorabilia collector profiles. The first memorabilia collector can have a profile maintained by the server 102. The first memorabilia collector profile can include an identity of the first memorabilia collector, an indication of the verification certificates owned by the first memorabilia collector, or the like. The second memorabilia collector profile can include an identity of the second memorabilia collector, and indication of the verification certificates owned by the second memorabilia collector, or the like.

At 603, in some implementations, the server, such as a server 102, can receive the request from the memorabilia collector imitated at 602.

If the second memorabilia collector does not have an identity maintained by the server 102, the server 102 can require the second memorabilia collector to register with the server 102.

At 604, the server 102 can be configured to request confirmation from the second memorabilia collector that they desire to receive the transfer of the verification certificate associated with the memorabilia item to be transferred. The request for confirmation can be provided through a mobile device 114 associated with the second memorabilia collector. The server 102 can also provide, to the second memorabilia collector, an indication of the restrictions on the transfer of the verification certificate associated with the memorabilia item to be transferred, set by the first memorabilia collector and/or the memorabilia creator. The server 102 can also provide one or more conditions of transfer set by the first memorabilia collector and/or the memorabilia creator.

The verification certificate for the memorabilia item can be generated for the specific purpose of verifying the authenticity of the signature and/or autograph, on the memorabilia item, of the memorabilia creator. In some examples, the verification certificate for a memorabilia item cannot be transferred from one memorabilia collector to another without the permission of the memorabilia creator. The memorabilia creator can specify at the time of creation of the verification certificate, or thereafter, that the memorabilia item can, or cannot, be transferred. The memorabilia creator can specify that the memorabilia creator is to receive a commission on any value exchanged for the memorabilia item or the transfer of the memorabilia item will be unauthorized and the verification certificate associated with the memorabilia item will become invalid.

At 605, a second collector can be asked to verify that they desire to proceed with the transfer of ownership of the memorabilia item from the first memorabilia collector. The request to verify can be received through an electronic device associated with the second memorabilia collector. For example, the request to verify can be provided through an email, a notification on a smart device, a text message, a telephone call, or the like.

At 606, if the second memorabilia collector rejects the transfer, the server 102 can notify the first memorabilia collector through the mobile device 112 associated with the first memorabilia collector. All information associated with the failed transfer can be purged by the server 102.

At 608, in response to the second memorabilia collector confirming the transfer of the verification certificate from the first memorabilia collector to the second memorabilia collector, the server 102 can initiate a verification certificate transfer protocol. The verification protocol can include multiple verification steps to verify the authenticity of the memorabilia item and/or the validity of the transfer.

At 610, the server 102 can obtain the verification record for the memorabilia item from memory 108. The verification record can include a record of prior transfers of the memorabilia item, previous digital images obtained of the memorabilia item, or the like. The verification record can include an identity of the memorabilia creator, date of creation, location of creation, original memorabilia collector, all transfers with all information of transfers, dates, images of all processed verifications and sequence of use of the verification certificate, or the like.

At 612, the server 102 can request one or more digital images to be taken of the memorabilia item at the time of transfer of the memorabilia item. In some variations, the digital image(s) can be obtained by the first memorabilia collector and/or the second memorabilia collector. The digital image(s) can be obtained at the time of transfer or can be obtained when the first memorabilia collector sends the memorabilia item and when the second memorabilia collector receives the memorabilia item. The digital images can be obtained from electronic devices associated with the memorabilia collectors.

At 614, in response to the first memorabilia collector not providing the digital image(s) of the memorabilia item for the transfer, the server 102 can terminates the request to verify the transfer of the ownership of the memorabilia item from the first memorabilia collector to the second memorabilia collector. The termination of the verification of the transfer means that the verification certificate is not associated with the second memorabilia collector.

At 616, the server 102 can notify the first memorabilia collector and the second memorabilia collector that the verification certificate is not to be transferred. The notification can be provided to the memorabilia collectors through electronic devices associated with the memorabilia collectors, through email, through applications, by text message, telephone call, or the like.

At 618, in response to the first memorabilia collector providing digital images of the memorabilia item, one or more digital images can be provided by the second memorabilia collector. The one or more digital images from the second memorabilia collector can be obtained by a camera of the mobile device 114 associated with the second memorabilia collector.

At 620, the server 102 prepares the received digital images for processing. Preparing the received digital images for processing can include color balancing, resizing, reorienting, or the like.

At 622, the server 102 can identify the number of digital images to process. In some variations, the memorabilia item may have had multiple owners and therefore, multiple images associated with the memorabilia item may be stored on the server. The number of digital images can include the images stored on the server, images from the first memorabilia collector, images from the second memorabilia collector, or the like.

At 624, the server 102 can analyze the digital images received from the first memorabilia collector, the second memorabilia collector, and/or stored on the server 102, or other servers. The server 102 can be configured to analyze the digital images to determine whether the memorabilia item, the autograph of the memorabilia creator, a message, or the like, are included within the digital image. The verification certificate 106 can include an indication of objects that should be present in the digital images.

At 626, the server 102 can compare the digital images received from the first memorabilia collector and/or the second memorabilia collector, to one or more original and historical images of the memorabilia item that are stored on a server 102. The server 102 can be configured to identify one or more objects in the digital images and make one or more comparisons of the identified objects with objects contained in historical digital images of the memorabilia item. The server 102 can be configured to compare the shape of object, color of object, size of object, shape of the autograph or signature, geometry of the autograph or signature, size of the autograph, size of object vs size of autograph or signature on object, location and placement of autograph or signature on object, color of background vs autograph or signature, illumination of objects hue of the color compared to the hue of the autograph or signature, and/or other comparisons.

At 628, a determination can be made whether the digital image(s) were processed properly. If the server 102 detects an error in the processing, the digital image(s) can be reprocessed by the server 102.

At 630, the server 102 can be configured to obtain images of the original autograph or signature and all subsequent verifications of the autograph or signature of the memorabilia item creator. In some implementations, a set of pixels associated with the memorabilia item can be identified within each of the digital images. The set of pixels can be identified by edge analysis techniques to identify edges of objects within a digital image. When the verification certificate associated with a memorabilia item indicates that the memorabilia item, for example, is a baseball, the edge analysis techniques can be configured to identify an object in the digital image that resembles a baseball. One or more pixels of the set of pixels can be identified that includes a likeness of the memorabilia collector. The likeness of the memorabilia collector can include a signature, a mark, or the like.

The server 102, can take the original and all subsequent certified versions of the signature/autograph and proceed to do an in-depth analysis of the autograph/signature of the memorabilia item. The server 102 can be configured to scale the new image(s) provided by the memorabilia collector(s). The new image(s) are scaled so that the size of the autogr9aph/signature in the new image(s) matches the size of the autograph/signature in the old image(s). The server 102 can perform a direct comparison of the original image(s) of the autograph/signature with the new image(s) being verified. The server 102 can perform a full topographical analysis of the new image(s) to the original image(s) and note of any variation. The server can compare the autographs/signatures by separating the image of the autograph/signature into sections. A first section of the signature/autograph can be compared to a first section of the new signature, a second section of the signature/autograph can be compared to a second section of the new signature, and so on until the entire signature is analyzed. The angles on letters and patterns are analyzed and compared. The color of the original autograph can be compared to the color of the new image. The color can be tracked over time and fading can be considered based on age, location, or the like, of the memorabilia item. The angles on all curves and loops are analyzed to verify that they match, the writing style is analyzed to ensure that it matches, separation between letters is compared, cross overs, dots and positioning of any additional marks is compared, or the like.

At 632, a determination can be made as to whether the images have been properly processed. The determination can be based on an error assessment associated with the digital images.

At 634, the server 102 proceeds to compare each one of the stored images from prior transfers of the certification and keeps track of each one. The server 102, can compare each certified image of the autograph/signature and all subsequent certified versions of the signature/autograph and proceeds to do an in-depth analysis of all historical images of the autograph/signature. The analysis performed can be similar to the analysis performed at step 530.

At 636, the server 102 can be configured to generate a report on the comparison of the image(s). The server 102 can use the information from all images and comparisons from the present and past objects and autographs/signatures to prepare a report. The report can be provided to the memorabilia item creator. The server 102 can transmit the latest image(s) of the memorabilia item including the autograph/signature to the memorabilia creator. The report can also be provided to the first memorabilia collector and the second memorabilia collector. The report can be provided to a mobile device 110 associated with the memorabilia creator.

At 637, the memorabilia creator and the memorabilia collector(s) can verify the authenticity of any new digital images of the memorabilia item. The verification can be based on the new digital image(s) being presented to the memorabilia collector(s) and memorabilia creator. The verification can be based on the report generated at 636.

At 638, the memorabilia creator can verify that the autograph or signature is a true likeliness of the memorabilia creator. In some variations, the memorabilia creator may be the only individual that can determine if the image(s) are of his or her image and likeness. The memorabilia creator can determine the originality of his autograph or signature as he or she is the expert of his or her own image and likeness.

At 640, in response to the memorabilia creator denying that the autograph/signature is original, the server notifies the first memorabilia collector and the second memorabilia collector that the memorabilia creator has denied the authenticity of the autograph/signature.

At 642, in response to the memorabilia creator verifying the autograph/signature, the server 102 can process the validation from the memorabilia creator. The server 102 can initiate the transfer of the validation certificate 106 associated with the memorabilia item from the first memorabilia collector to the second memorabilia collector.

At 644, the first memorabilia collector is notified of the positive outcome of the verification of the memorabilia item. At 646, the second memorabilia collector is notified of the positive outcome of the verification of the memorabilia item. The notifications can be provided through one or more of an electronic device, an email, a text message, a phone call, or the like.

At 648, the server 102 can request that the second memorabilia collector confirm the transfer of the memorabilia item. In some implementations, the server 102 can request that the first memorabilia collector confirm the transfer of the memorabilia item. Confirmation of the transfer can be provided through one or more of verifying the transfer through an interaction with an application running on a computing device, replying to an email, affirmatively responding to a text message, verifying via a telephone call, or the like.

At 650, the server 102 transfers the verification certificate associated with the memorabilia item. The verification certificate 106 can be moved from the first memorabilia collector profile maintained by the server 102 to the second memorabilia collector profile maintained by the server 102. The server 102 can update the verification record associated with the memorabilia item to include the digital image(s) obtained by the server 102 during the transfer from the first memorabilia collector and the second memorabilia collector. The verification record can be updated with the report generated by the server 102.

The server(s) 102 can include one or more processors 104. Processor(s) 104 is configured to provide information processing capabilities to server(s) 102 having one or more features consistent with the current subject matter. Processor 104 may include one or more of a digital processor, an analog processor, a digital circuit designed to process information, an analog circuit designed to process information, a state machine, and/or other mechanisms for electronically processing information. Although processor 104 is shown in FIG. 1 as a single entity, this is for illustrative purposes only. In some implementations, processor(s) 104 may include a plurality of processing units. These processing units may be physically located within the same device, or processor(s) 104 may represent processing functionality of a plurality of devices operating in coordination. The processor(s) 104 may be configured to execute machine-readable instructions, which, when executed by the processor(s) 104 may cause the processor(s) 104 to perform one or more of the functions described in the present description. The functions described herein may be executed by software; hardware; firmware; some combination of software, hardware, and/or firmware; and/or other mechanisms for configuring processing capabilities on processor(s) 104.

Electronic storage 108 may comprise electronic storage media that electronically stores information. The electronic storage media of electronic storage 108 may include one or both of system storage that is provided integrally (i.e., substantially non-removable) with a computing device, and/or removable storage that is removably connectable to server 102 via, for example, a port (e.g., a USB port, a firewire port, etc.) or a drive (e.g., a disk drive, etc.). Electronic storage 108 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 108 may include one or more virtual storage resources (e.g., cloud storage, a virtual private network, and/or other virtual storage resources). Electronic storage 108 may store software algorithms, information determined by processor 104, information received from one or more computing devices, such as server 102, client computing devices, information that enables the one or more computing device to function, or the like.

Figure 7:
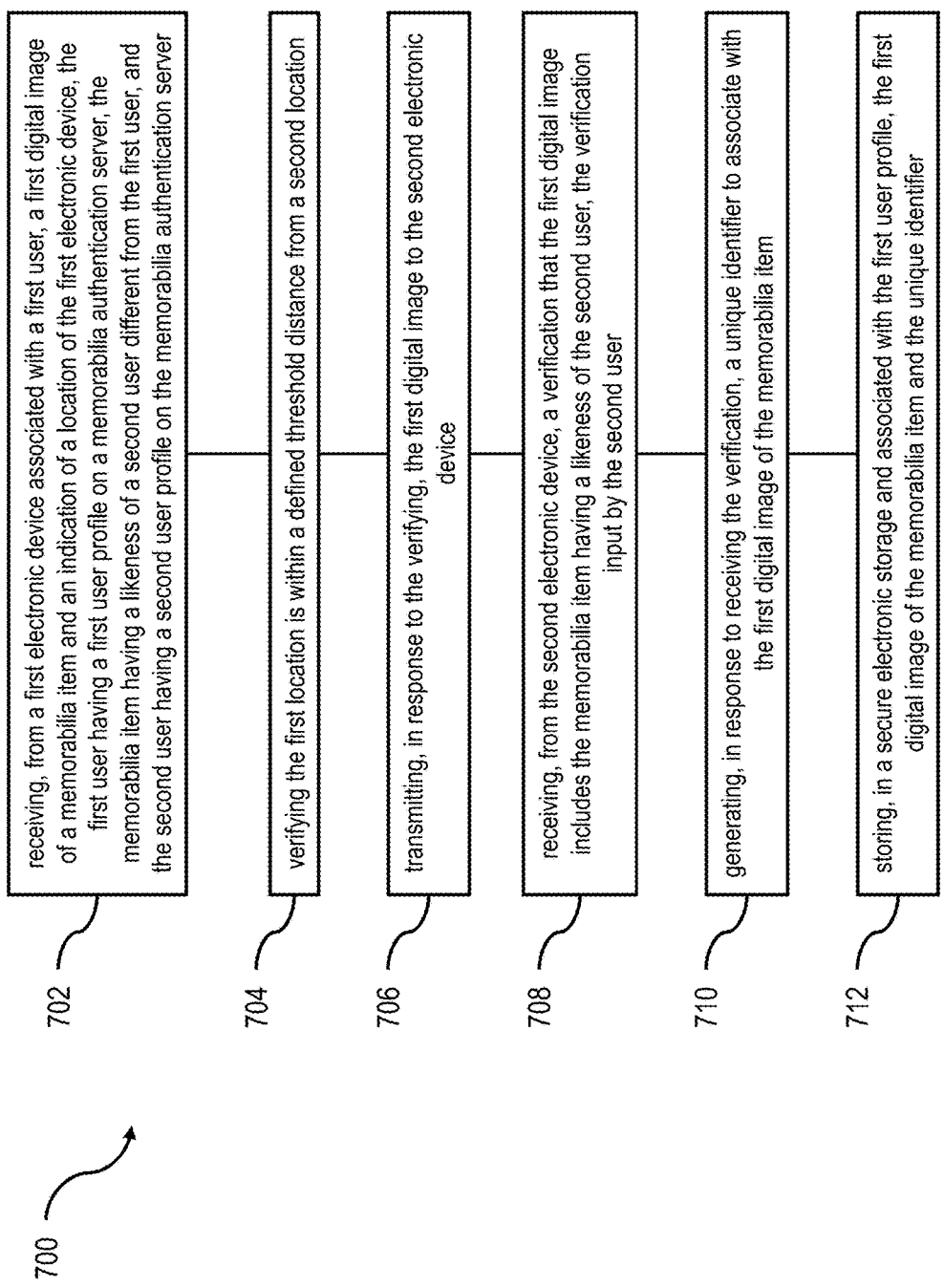
FIG. 7 shows a process flow having one or more features consistent with the presently described subject matter.

FIG. 7 shows a process flow 700 having one or more features consistent with the presently described subject matter. The operations described in process flow 700 can be performed by one or more of the system components described in the present description, for example, one or more of the system components of system 100.

At 702, a first digital image can be received from a first electronic device associated with a first user. The first digital image can include at least an image of a memorabilia item. An indication of a location of the first electronic device can be received. The first user can have a first user profile on a memorabilia authentication server. The memorabilia item can have a likeness of a second user different from the first user. The second user can have a second user profile on the memorabilia authentication server. The first digital image can be obtained by a camera of the first electronic device.

At 704, a verification that the first location is within a defined threshold distance from a second location can be performed. The verification can be performed using location information from a first electronic device associated with the first user and location information from a second electronic device associated with the second user.

At 706, the first digital image can be transmitted to the second electronic device. The transmitting of the first digital image can be performed in response to verifying that the first location, associated with the first user, is within a predefined threshold distance from the second location, associated with the second user. The verification can be performed by a server, such as a memorabilia verification server.

At 708, a verification can be received from the second electronic device. The verification can include an indication that the first digital image includes the memorabilia item having a likeness of the second user. The verification can be input by the second user. The verification can be input by the second user through a graphical user interface presented on a display device of the second electronic device associated with the second user.

At 710, a unique identifier can be generated. The unique identifier can be associated with the first digital image of the memorabilia item. The unique identifier can be generated in response to the verification that the first digital image includes the memorabilia item having a likeness of the second user.

At 712, the first digital image of the memorabilia item and the unique identifier can be stored. The first digital image of the memorabilia item and the unique identifier can be stored in a secure electronic storage and associated with the first user profile. The storing can be performed by a server, such as a memorabilia authentication server. In some examples, the first digital memorabilia item and the unique identifier being stored in associated with the first user profile can be published to a distributed database system.

Figure 8:
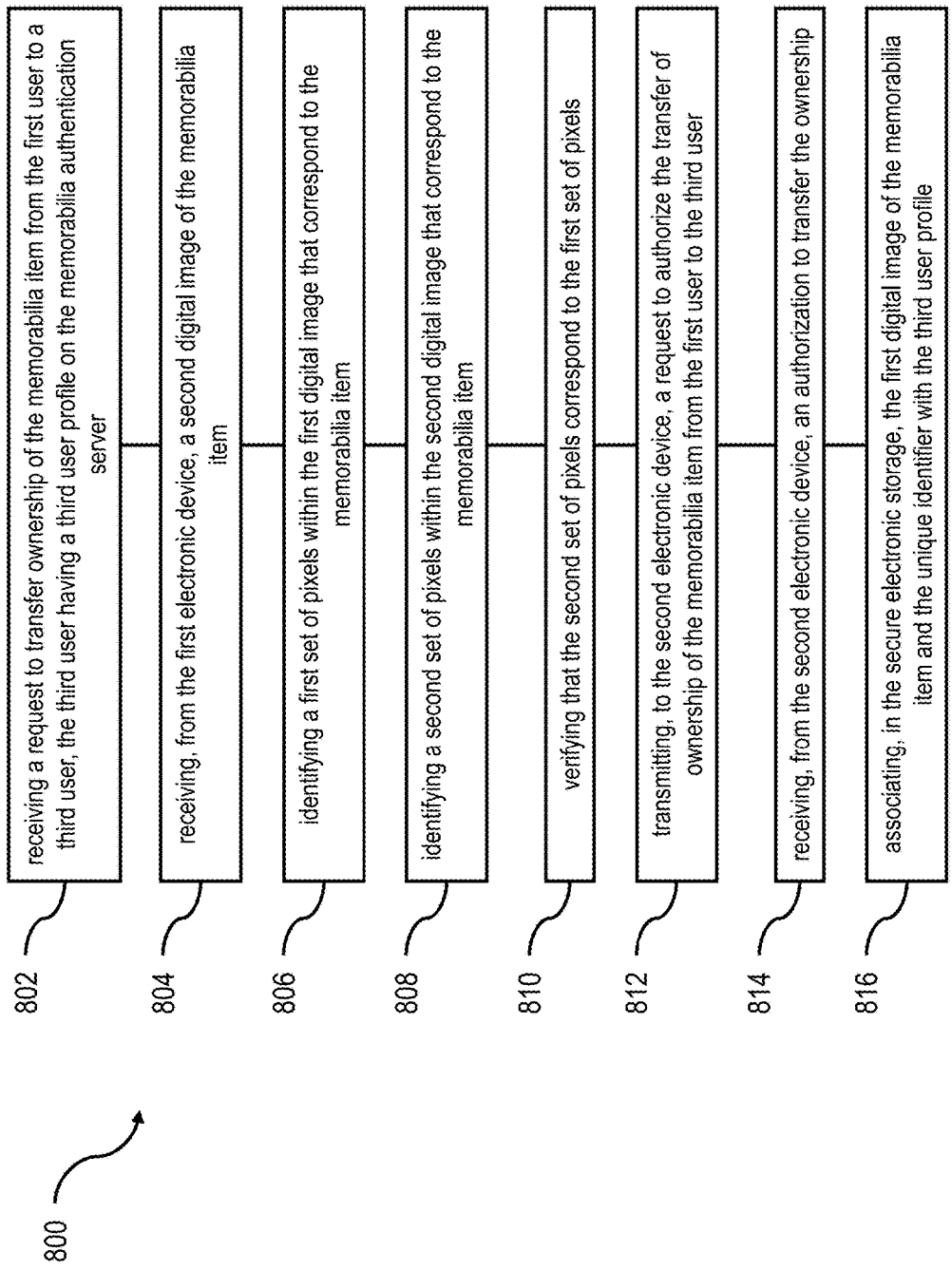
FIG. 8 shows a process flow having one or more features consistent with the presently described subject matter.

FIG. 8 shows a process flow 800 having one or more features consistent with the presently described subject matter. The operations described in process flow 800 can be performed by one or more of the system components described in the present description, for example, one or more of the system components of system 100.

At 802, a request can be received to transfer ownership of the memorabilia item from the first user to a third user. The third user can have a third user profile on the memorabilia authentication server. The request can be received from a first electronic device associated with the first user. The request can be received at the memorabilia authentication server.

At 804, a second digital image of the memorabilia item can be received from the first electronic device. The image can be obtained by a camera of the first electronic device.

At 806, a first set of pixels can be identified within the first digital image that correspond to the memorabilia item. The first set of pixels can be identified by the first electronic device. In some implementations, the first electronic device can run a software application that includes instructions for identifying memorabilia items in an image.

At 808, a second set of pixels within the second digital image can be identified that correspond to the memorabilia item. The second set of pixels can be identified by the first electronic device.

At 810, a verification that the second set of pixels correspond to the first set of pixels can be performed. The verification can be performed by the memorabilia authentication server.

At 812, a request to authorize the transfer of ownership of the memorabilia item from the first user to the third user can be transmitted to an electronic device associated with the second user. The second user can be the memorabilia creator.

At 814, an authorization to transfer the ownership can be received from the second electronic device. The authentication can be received at the memorabilia authentication server.

At 816, the first digital image of the memorabilia item and the unique identifier can be stored in electronic memory and associated with the third user profile. The operations performed at 816 can be performed by a memorabilia authentication server, or the like. In some implementations, the first digital image of the memorabilia item and the unique identifier both being associated with the second user profile can be published to a distributed database system.

FIGS. 9A-9D show views of a graphical user interface having one or more features consistent with the presently described subject matter. In some example, FIGS. 9A-9D illustrate a sequence of graphical user interfaces presented to a memorabilia creator and a memorabilia collector for authenticating a memorabilia item.

Figure 9A:
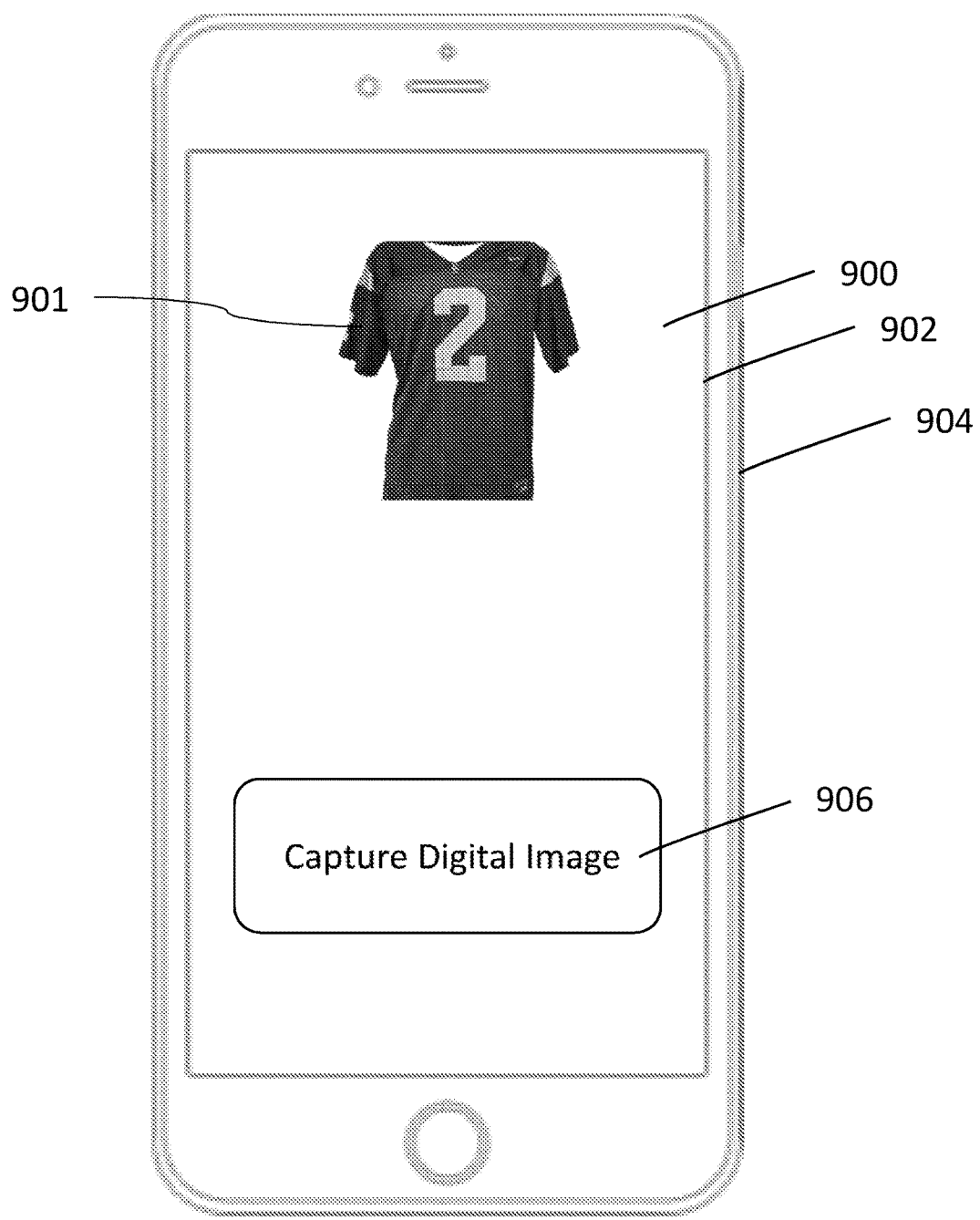
FIGS. 9A-9D show views of a graphical user interface having one or more features consistent with the presently described subject matter.

FIG. 9A illustrates a user interface 900 presented on a display 902 of a mobile computing device 904. The mobile computing device 904 can be associated with a memorabilia collector. The mobile device 904 can include one or more image sensors, for example, a camera. The graphical user interface 900 can be configured to facilitate input by a user of the mobile device 904 that causes the mobile device 904 to capture a digital image. The digital image can be, for example, a memorabilia image 901 of a memorabilia item. An interactive button 906 can be configured to facilitate control over an image sensor of the mobile device 904.

Figure 9B:
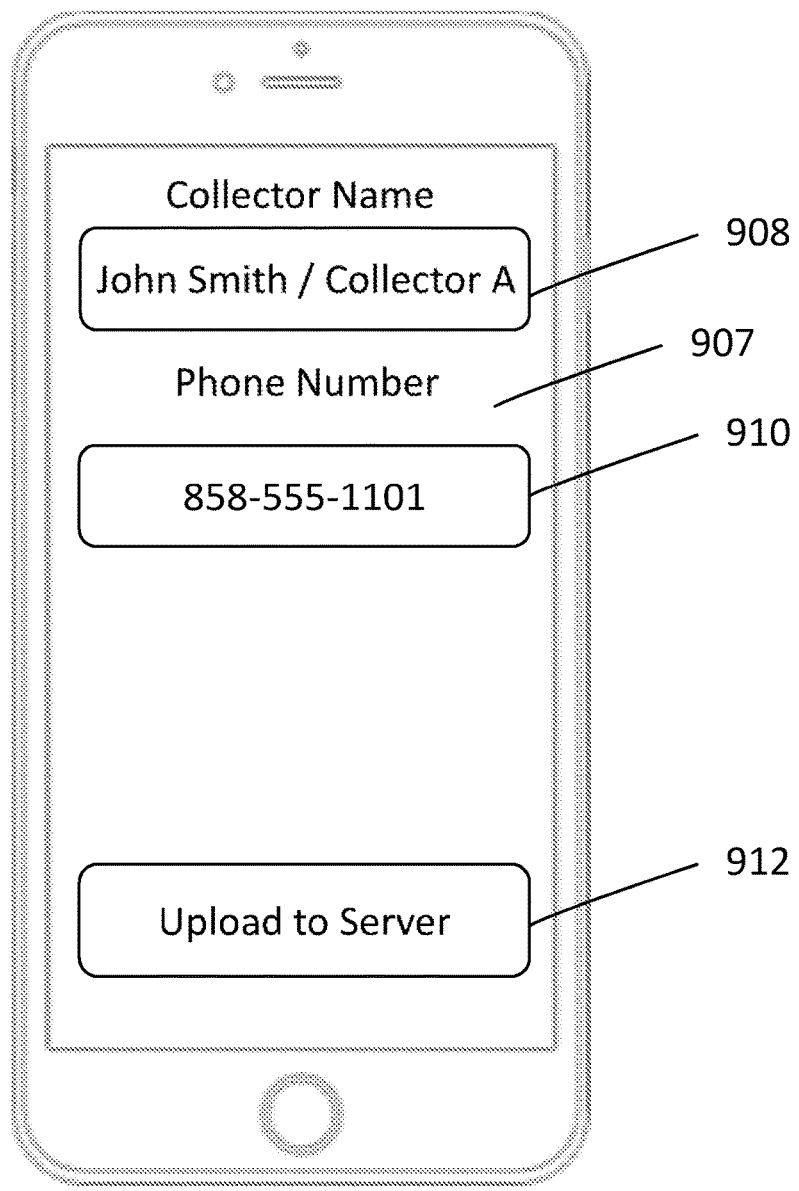

FIG. 9B illustrates a graphical user interface 907 presented on the display device 902 of the mobile device 904. The graphical user interface 907 can include one or more entry fields 908 and 910. The entry fields 908 and 910 can be configured to facilitate entry, by a user associated with the mobile device 904, of user information. The graphical user interface 907 can include a execution button 912. The execution button 912 can facilitate confirmation of the information entered into the entry field 908 and 910 and cause the mobile device 904 to send the information to a server. The digital image of the memorabilia item can also be sent to the server.

Figure 9C:
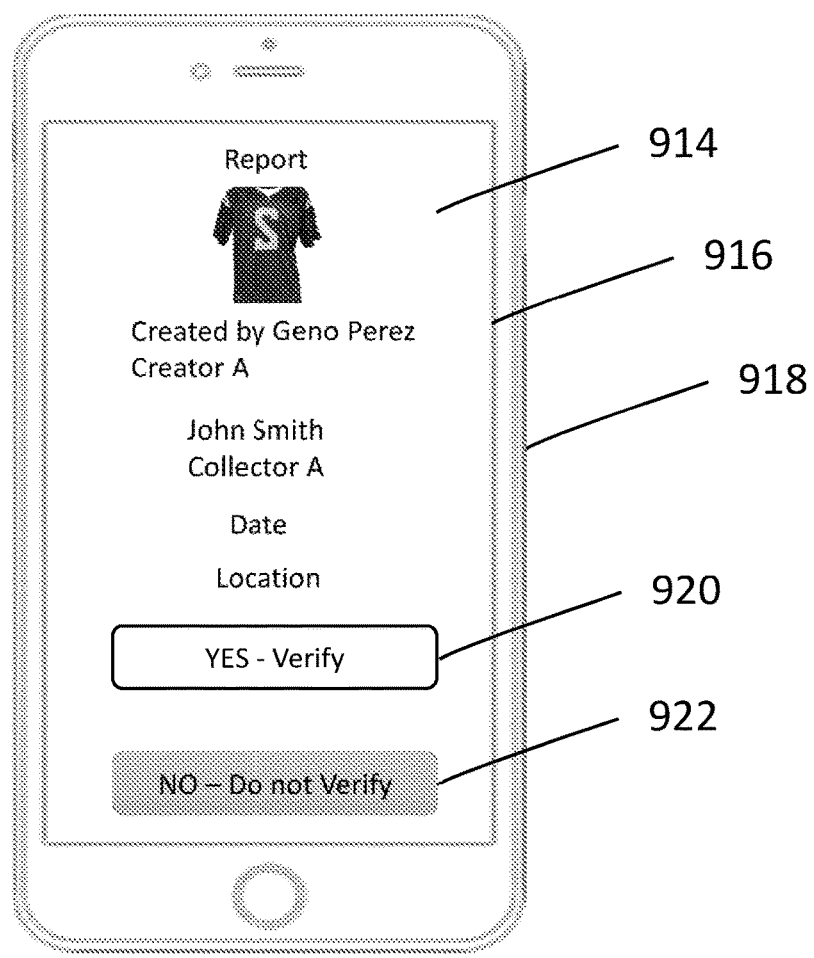

FIG. 9C illustrates a graphical user interface 914 presented on a display 916 of a mobile device 918. The mobile device 918 can be associated with a memorabilia creator, such as a celebrity, sports personality, future sports star, or the like. The server can be configured to transmit the digital image of the memorabilia item to a mobile device 918 associated with the creator of the memorabilia item. The graphical user interface 914 presented on the display device 916 of the mobile device 918 can be configured to facilitate verification, by the memorabilia creator, that the digital image of the memorabilia item is authentic and is a true representation of a memorabilia item associated with the memorabilia creator. The memorabilia creator can verify or decline using one or more interactive buttons, for example, interactive buttons 920 and 922. In response to the memorabilia creator verifying that the image is authentic, a server can be configured to generate an authentication certificate. The authentication certificate comprising the image of the memorabilia item, an identity of the memorabilia creator, and an identity of the present owner of the memorabilia item.

Figure 9D:
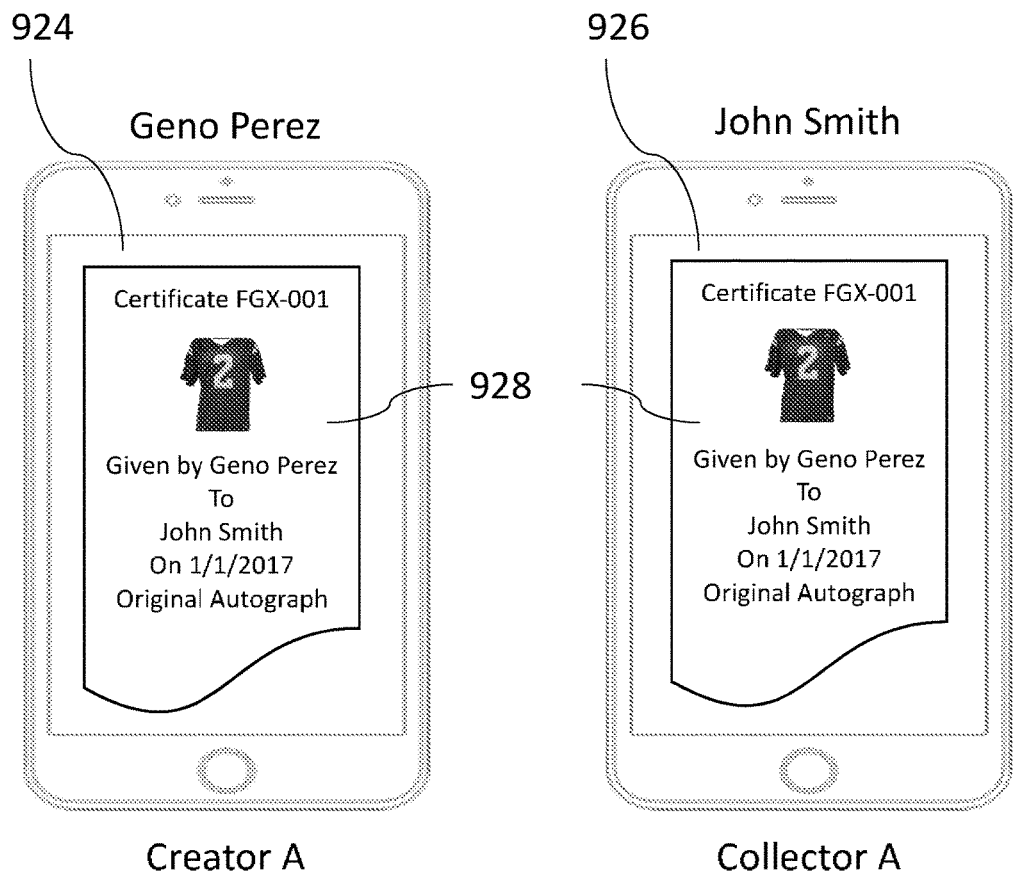

FIG. 9D illustrates a graphical user interface 924 associated with the mobile device of the memorabilia creator and a graphical user interface 926 associated with the mobile device of the memorabilia collector. The graphical user interfaces 924 and 926 can be configured to present a copy of the authentication certificate 928 created by the server in response to the authentication by the memorabilia creator.

FIGS. 10A-10G show views of a graphical user interface having one or more features consistent with the presently described subject matter. In some examples, FIGS. 10A-10G illustrate a series of graphical user interfaces presented to a memorabilia collector and a memorabilia creator for the authentication of a memorabilia item that has an autograph of the memorabilia creator on it.

FIG. 10A illustrates a memorabilia collector 1002 desirous of obtaining an autograph 1008 of a memorabilia creator 1006 to be put on a memorabilia item 1004. FIG. 10B illustrates the memorabilia creator 1006 putting an autograph 1008 on the memorabilia item 1004.

FIG. 10C illustrates a memorabilia collector 1004 obtaining a digital image 1014 of the memorabilia item 1004 with the autograph 1008 obtained by a mobile device 1010 associated with the memorabilia collector 1002. A graphical user interface 1012 can be presented on a display device of the mobile device 1010. The graphical user interface 1012 can be configured to facilitate capture, by the mobile device 1010, of the image 1014 of the memorabilia item 1004 and the autograph 1008. The graphical user interface 1012 can be configured to facilitate capture of the image 1014 by a user through one or more radio buttons 1016. The graphical user interface 1012 can be configured to facilitate entry of an identity of the memorabilia creator, for example, through an entry field 1018.

Figure 10E:
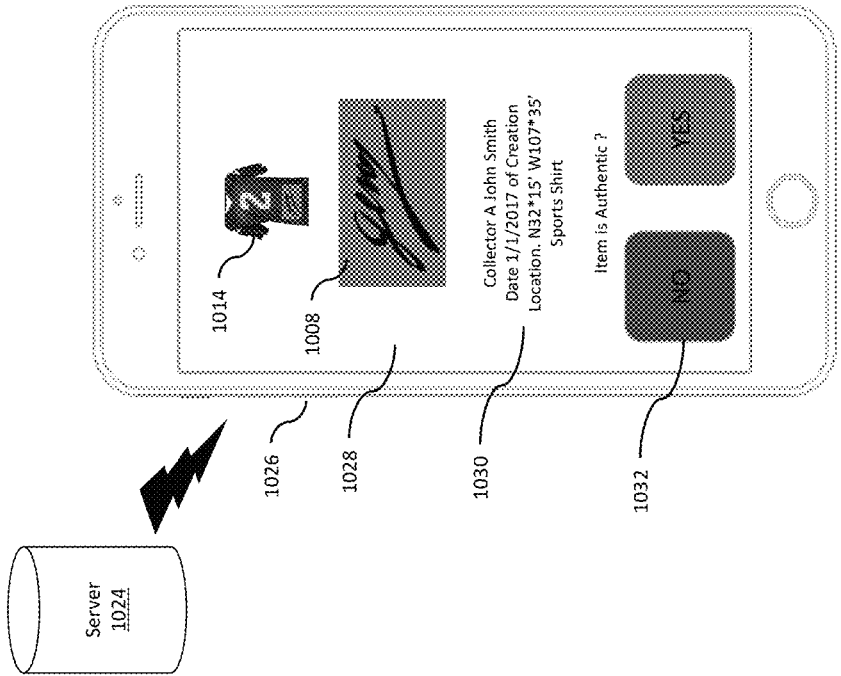
Figure 10D:
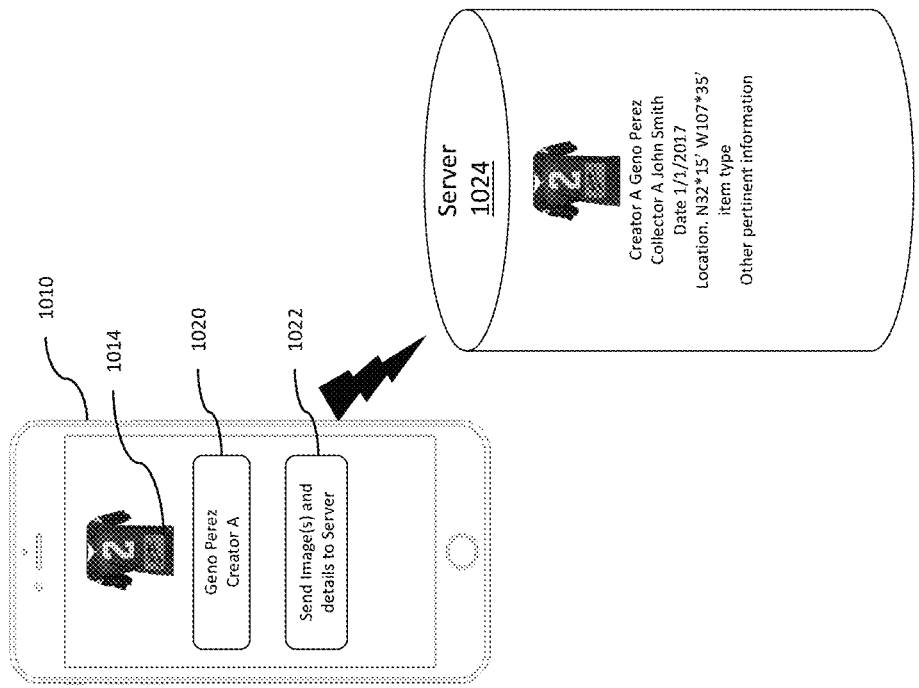

FIG. 10D illustrates a mobile device 1010 associated a memorabilia collector. The graphical user interface presented on a display of the mobile device 1010 can be configured to facilitate sending of the image 1014 of the memorabilia item to a server 1024, by, for example, an interaction with a radio button 1022. The graphical user interface can facilitate entry of an identity of the memorabilia creator 1020. The mobile device 1010 can send location information with the image 1014 and other information associated with the memorabilia item to the server 1024.

FIG. 10E illustrates a graphical user interface 1028 presented on a display of a mobile device 1026 associated with a memorabilia creator. The graphical user interface 1028 can be configured to present an image 1014 of the memorabilia item, an image 1008 of the signature, or other mark, put on the memorabilia item by the memorabilia creator, additional information 1030 about the memorabilia item, for example, creation data, creation location, collector identity, or the like. The graphical user interface 1028 can comprise one or more radio buttons 1032 configured to facilitate selection, by the memorabilia creator, of a rejection or an authentication of the memorabilia item. The server 1024 can be configured to identify, using one or more image analysis techniques, an autograph, or the like, of the memorabilia creator in the image of the memorabilia item. The server 1024 can be configured to enlarge the portion of the image associated with the autograph, or the like, for individual presentation to the memorabilia creator in the graphical user interface 1028 presented on a display device of mobile device 1026 associated with the memorabilia creator.

Figure 10G:
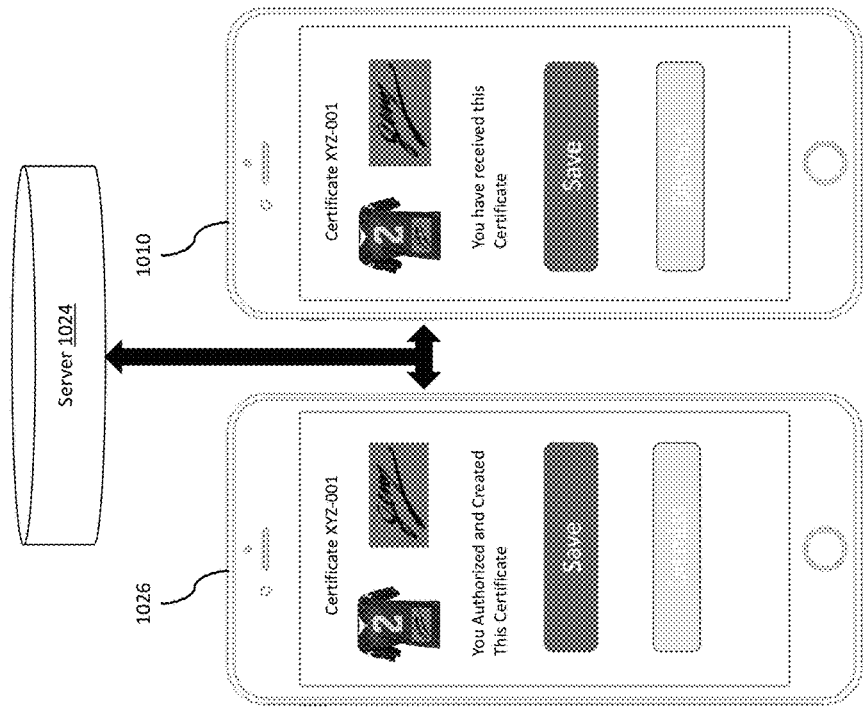
Figure 10F:
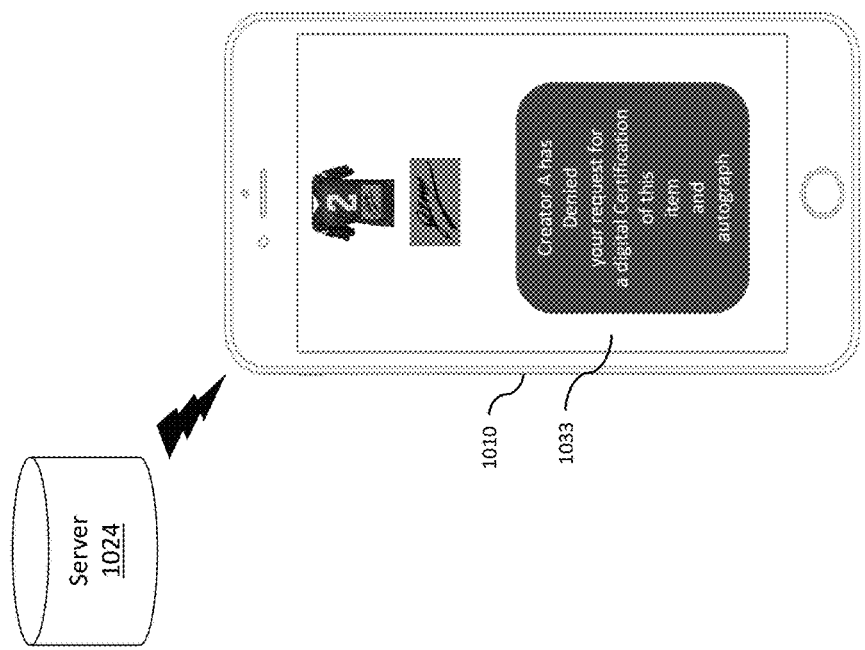

FIG. 10F is an illustration of a graphical user interface 1033 presented to the memorabilia collector through a display of a mobile device 1010 associated with the memorabilia collector. The graphical user interface 1033 can be presented to the memorabilia collector in response to the memorabilia creator rejecting the memorabilia item as being authentic.

In response to the memorabilia creator authenticating the image of the memorabilia, the server 1024 can be configured to generate an authentication certificate. The authentication certificate can include the image of the memorabilia item, information associated with the creation of the memorabilia item (for example, location, date, time, of the like), the identity of the memorabilia creator, the identity of the memorabilia collector (in this case the owner of the memorabilia item), or the like.

FIG. 10G shows a graphical user interfaces presented to the memorabilia creator through a mobile device 1026 associated with the memorabilia creator, and to the memorabilia collector through a mobile device 1010 associated with the memorabilia collector, that are presented in response to the memorabilia creator authenticating the image of the memorabilia item as being authentic.

Figure 11B:
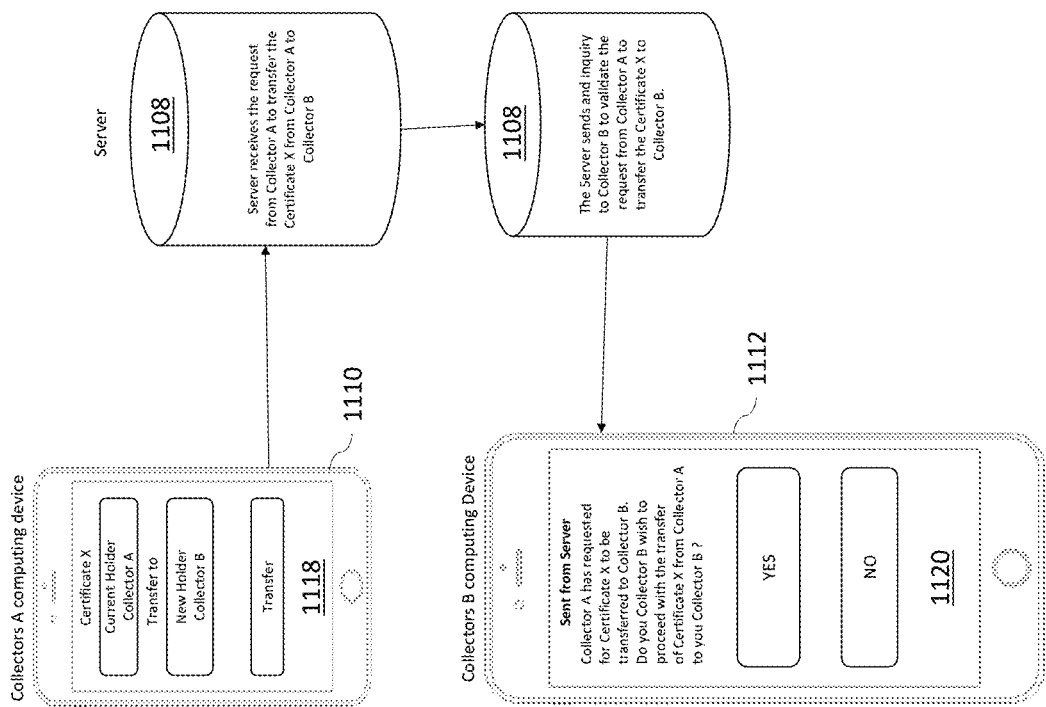
Figure 11A:
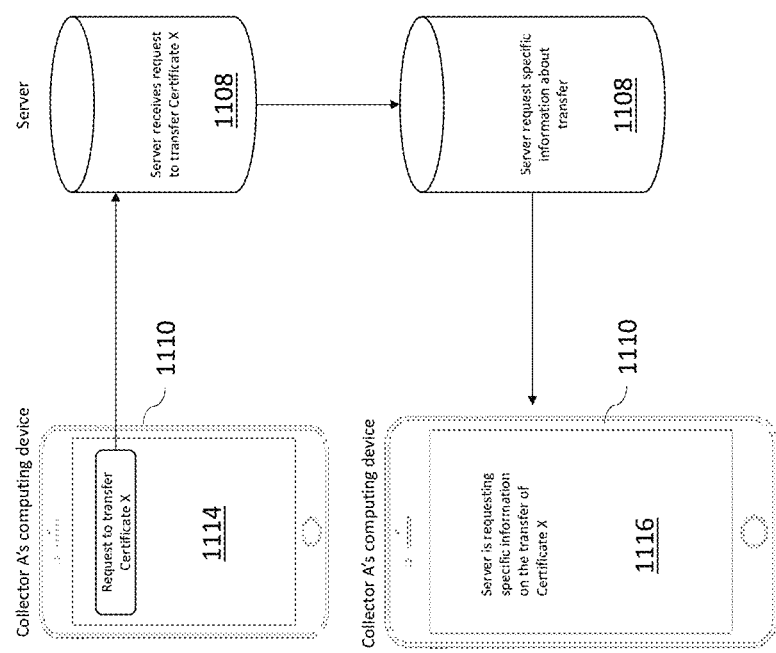

FIGS. 11A-11J show views of a graphical user interface having one or more features consistent with the presently described subject matter. In some examples, FIGS. 11A-11Q illustrate a series of graphical user interface presented to a first memorabilia collector, a second memorabilia collector and a memorabilia creator, when the first memorabilia collector desires to transfer the authenticated ownership of a memorabilia item to the second memorabilia collector.

FIG. 11A illustrates a graphical user interface presented on a mobile device 1110 associated with a first memorabilia collector in response to the first memorabilia collector indicating a desire to transfer ownership of a memorabilia item to a second memorabilia collector. The graphical user interface 1114 can be presented on a display device of a mobile device 1110 associated with a first memorabilia collector. The graphical user interface 1114 can be configured to facilitate an entry by the first memorabilia collector of an indication that the first memorabilia collector wants to transfer the ownership of the memorabilia item to a second memorabilia collector. The graphical user interface 1116 can be configured to request information about the transfer.

FIG. 11B illustrates graphical user interfaces presented to the first and second memorabilia collectors during a transfer of ownership of the memorabilia item. Graphical user interface 1118 can be presented on a display of the mobile device 1110 associated with the first memorabilia collector. The graphical user interface 1118 can include a plurality of fields for information about the transfer. Some of the fields can be for entering information by the first memorabilia collector. For example, the graphical user interface 1118 can include a field that identifies the present holder of the certificate of authentication for the memorabilia item. The graphical user interface 1118 can include a field for identifying the transferee for the certificate of authentication, for example, the second memorabilia collector. In some variations, the field for identifying the transferee can be a field where the first memorabilia collector can enter an identity of the second memorabilia collector. The second memorabilia collector can be registered with a system managing the authentication certificate for the memorabilia item. The field for identifying the transferee can facilitate entry of an identity of the second memorabilia collector, a dropdown menu, or the like. The graphical user interface 1118 can include an interactive button for receiving confirmation to transfer the authentication certificate of a memorabilia item from the first memorabilia collector to the second memorabilia collector. In response to receiving the instruction to transfer the server 1108 managing the authentication certificate can initiate the transfer on the back-end system.

A graphical user interface 1120 presented on a display of a mobile device of the second memorabilia collector can include one or more interactive buttons for confirming or denying the transfer.

Figure 11D:
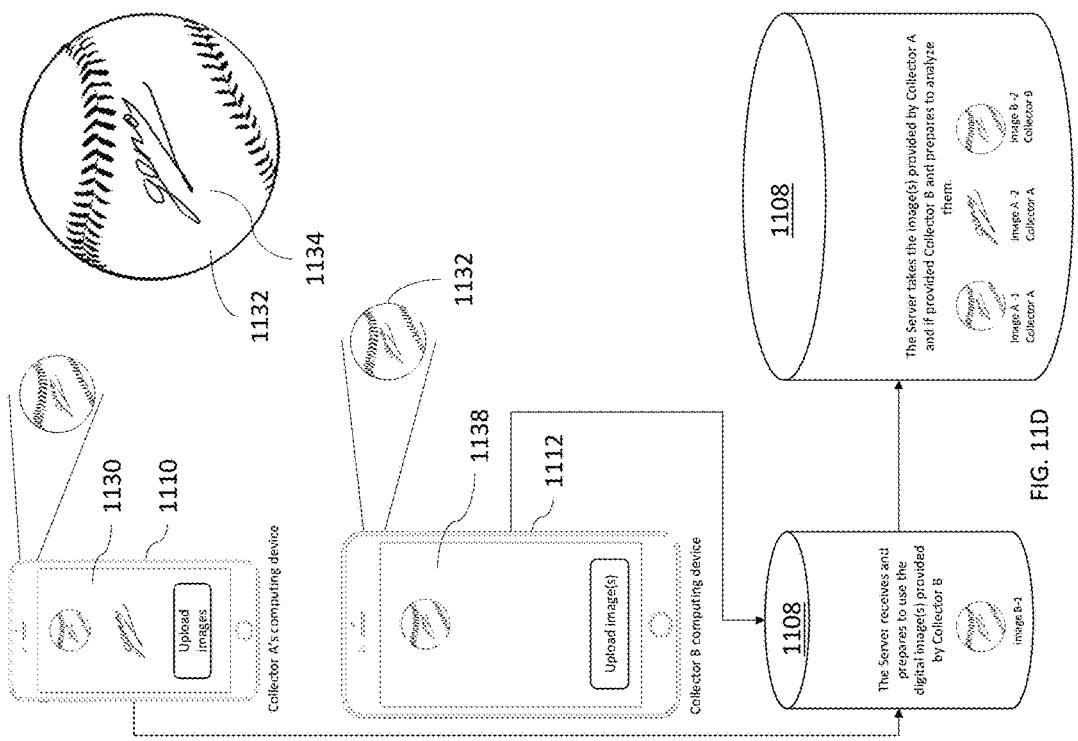
Figure 11C:
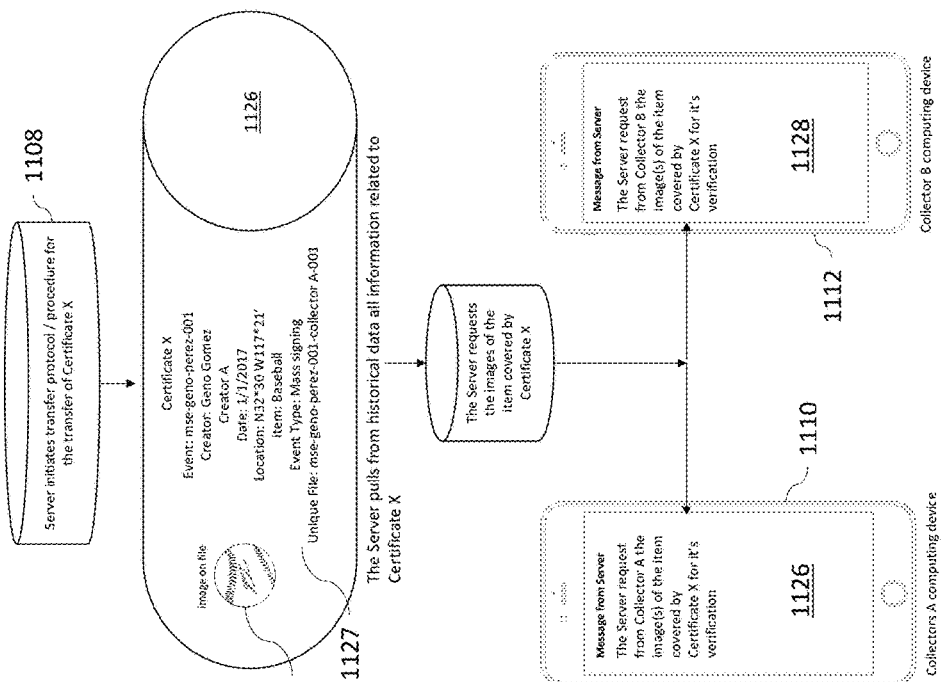

FIG. 11C shows the graphical user interfaces presented to the first and second memorabilia collectors after initiation of the transfer. A server 1108 can be configured to manage the authentication certificates associated with memorabilia items. The server 1108 can have an electronic storage 1126 storing the authentication certificates 1127. The authentication certificates 1127 can include information associated with the creation of the memorabilia item and one or more images 1124 of the memorabilia item.

The server 1108 can request a current image of the memorabilia item from the first memorabilia collector. In response to the request, the mobile device 1110 associated with the memorabilia collector can be configured to present a graphical user interface 1126 requesting that an image of the memorabilia item be taken by the mobile device or uploaded to the server 1108. The server 1108 can also request an updated image from the second memorabilia collector. In response to the request, the mobile device 1112 associated with the second memorabilia collector can be configured to present a graphical user interface that includes a request to obtain an image of the memorabilia item.

FIG. 11D illustrates a graphical user interface 1130 presented on a display device of a mobile device 1110 associated with the first memorabilia collector and a graphical user interface 1138 presented on a display device of a mobile device 1112 associated with the second memorabilia collector. The graphical user interfaces 1130 and 1138 can be configured to facilitate capture and upload of an image of the memorabilia item 1132 and/or an autograph 1134, or the like, of a memorabilia creator, that is on the memorabilia item 1132. The graphical user interfaces 1130 and 1138 can include an interactive button that can be selected by the first and second memorabilia collectors to upload the images of the memorabilia item 1132 and/or the autograph 1134, or the like, on the memorabilia item 1132, to the server 1108.

The server 1108 can be configured to analyze the images. The server can analyze the original image of the memorabilia item 1132 when the memorabilia item was original created and compare that image against the image of the memorabilia item taken by the first memorabilia collector and the image of the memorabilia item taken by the second memorabilia collector. The server 1108 can be further configured to analyze the autographs, or the like, in all three images. Having analyzed the images, the server 1108 can be configured to compare the memorabilia item and/or the autograph, or the like, from each image. The comparison can include one or more image analysis techniques to identify like-features in each of the images to determine whether the memorabilia item appearing in one image is the same memorabilia item appearing in another image.

In response to the initiation of the transfer by the first memorabilia collector, the acceptance of the transfer by the second memorabilia collector and the receipt of the images, the server 1108 can be configured to cause an application running on the mobile device of the memorabilia creator to initialize. A notification can be presented to the memorabilia creator that a transfer is pending the memorabilia creator's authorization.

FIG. 11E shows a graphical user interface 1142 presented on a display of a mobile device 1113 associated with the memorabilia creator that can be displayed in response to the initiation of the transfer of an authentication certificate, associated with a memorabilia item. The graphical user interface 1142 can be configured to present a copy of the authentication certificate to the memorabilia creator. The authentication certificate can include information associated with the creation of the memorabilia item as well as the original image of the memorabilia item.

FIG. 11F shows a series of graphical user interfaces 1142, 1144, 1146 and 1148 presented on a display of a user device associated with the memorabilia creator. The graphical user interface 1142 can include a report, generated by the server 1108, of the analysis of the image of the memorabilia item provided by the first memorabilia collector, or the transferor. The graphical user interface 1144 can include a report, generated by the server 1108, of the analysis of the image of the memorabilia item provided by the second memorabilia collector, or transferee. The reports provided in the graphical user interfaces 1142 and 1144 can provide a likelihood that the image provided by the first and second memorabilia collectors are images of the original memorabilia item. The graphical user interfaces 1142 and 1144 can be configured to facilitate selection of the images of the memorabilia item for enlargement on the screen of the mobile device associated with the memorabilia creator. The graphical user interfaces 1142 and 1144 can be configured to facilitate zooming in to the images, moving the images in any direction, rotation of the images, side-by-side comparison of the images or the like. Furthermore, the graphical user interfaces 1142 and 1144 can facilitate a side-by-side comparison with the original image of the memorabilia item as stored and managed by the server 1108.

In some variations, the server 1108 and/or the mobile device 1113 can be configured to generate a mask from one or more of the original image of the memorabilia item, the image of the memorabilia item provided by the first memorabilia collector, and the image of the memorabilia item provided by the second memorabilia collector. The mask can allow one or more of the images to be overlaid one or more of the other images. The mask can be configured to scale the image such that the image of the memorabilia item in each image has the same or similar dimensions. The mask can be configured to rotate the image such that the image of the memorabilia item in each image can have the same or similar orientation. The mask can cause each image to be transparent compared to one or more of the other images, allowing the memorabilia creator to see through one image to the next image to facilitate a comparison of the images by the memorabilia creator. Similar functionality can be provided to the memorabilia collectors so that the memorabilia collectors can also verify that the memorabilia item is authentic. Graphical user interface 1146 can include a comparison of the analysis performed with respect to the first memorabilia collector's image and the second memorabilia collector's image. Graphical user interface 1148 can include one or more interactive buttons allowing a memorabilia creator to certify that the provided images are true images of the memorabilia item.

In response to the memorabilia creator denying the certification of the transfer, the first and second memorabilia collectors can be notified. The notification can be generated by the server 1108 and transmitted to mobile device 1110 and 1112 associated with the first and second memorabilia collectors.

FIG. 11G shows graphical user interface 1152 and 1154 presented to the first and second memorabilia collectors after confirmation that the memorabilia creator has certified the transfer. The notification can be transmitted from the server 1108 to the mobile devices 1110 and 1112 associated with the first and second memorabilia collectors.

FIG. 11H shows a graphical user interface 1158 presented on a display of a mobile device 1112 associated with the second memorabilia collector, or the transferee of the authentication certificate. The graphical user interface 1158 can comprise one or more interactive buttons to allow the second memorabilia collector to confirm or reject the transfer of the authentication certificate.

Figure 11J:
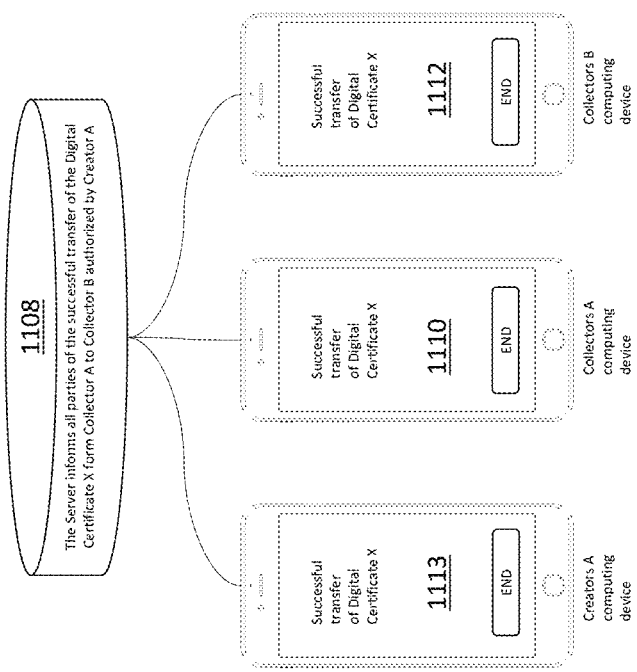
Figure 11I:
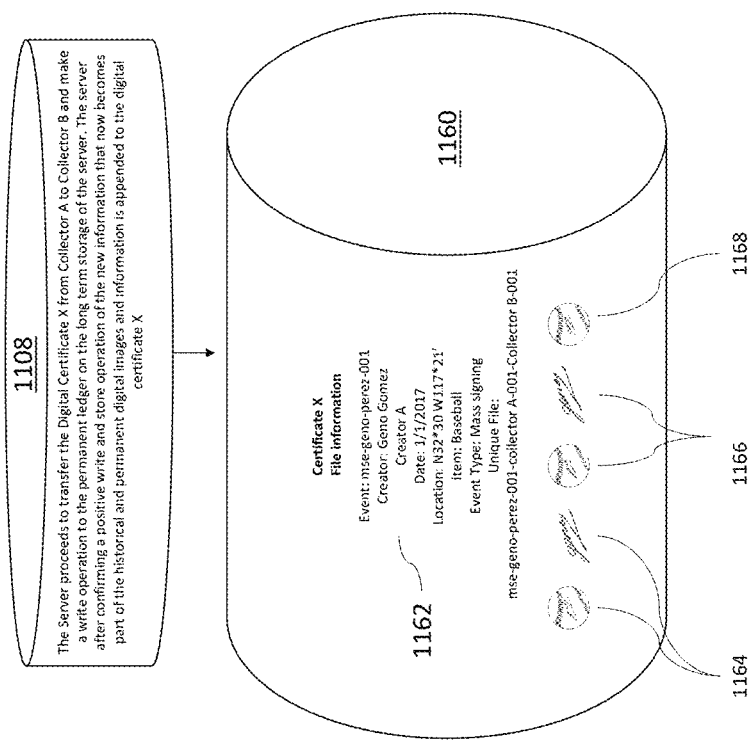

FIG. 11I shows an electronic storage 1160 storing an updated authentication certificate 1162. The updated authentication certificate can include information about the original creation event of the memorabilia item, information about the memorabilia item, and information about each transfer of the authentication certificate. The authentication certificate 1162 can also include a record of all the images taken of the memorabilia item, including the original image 1164 and each image 1166 and 1168 taken at a transfer of the authentication certificate 1162.

FIG. 11J shows graphical user interfaces presented on each mobile device 1110, 1112, and 1113, belonging to the first memorabilia collector, the second memorabilia collector and the memorabilia creator, respectively. The graphical user interfaces shown in FIG. 11J can each include a notification that the transfer has been complete. The graphical user interfaces shown in FIG. 11J can each be presented in response to a trigger generated by the server 1108 to cause them to be generated.

FIGS. 12A-12H show views of a graphical user interface having one or more features consistent with the presently described subject matter. FIGS. 12A-12H illustrate graphical user interfaces that can be presented to a memorabilia creator and a memorabilia collector that are configured to facilitate the creation of a memorabilia item. The memorabilia collector 1202 can be associated with a mobile device 1206. The memorabilia creator 1204 can be associated with a mobile device 1208. The mobile devices 1206 and 1208 can be configured to obtain location information associated with themselves. For example, GPS signals, wireless network identity information, or the like.

The memorabilia creator 1204 may autograph, or the like, a memorabilia item 1212 and give it to the memorabilia collector 1202. The memorabilia collector 1202 can be desirous to generate an authentication certificate for the memorabilia item 1212. A graphical user interface 1214 can be presented on a screen of the mobile device 1206 associated with the memorabilia collector 1202. The graphical user interface can comprise one or more interaction segments configured to facilitate capture of an image 1216 of the memorabilia item with a camera of the mobile device 1206. At 1218, the memorabilia collector 1202 can be prompted to upload the image 1216 of the memorabilia item to a platform server.

Figure 12B:
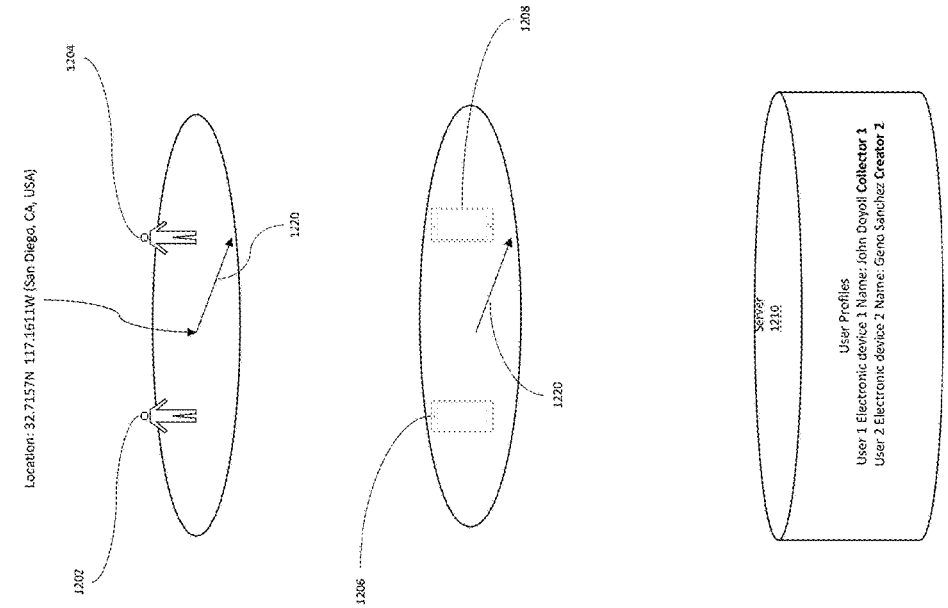
Figure 12A:
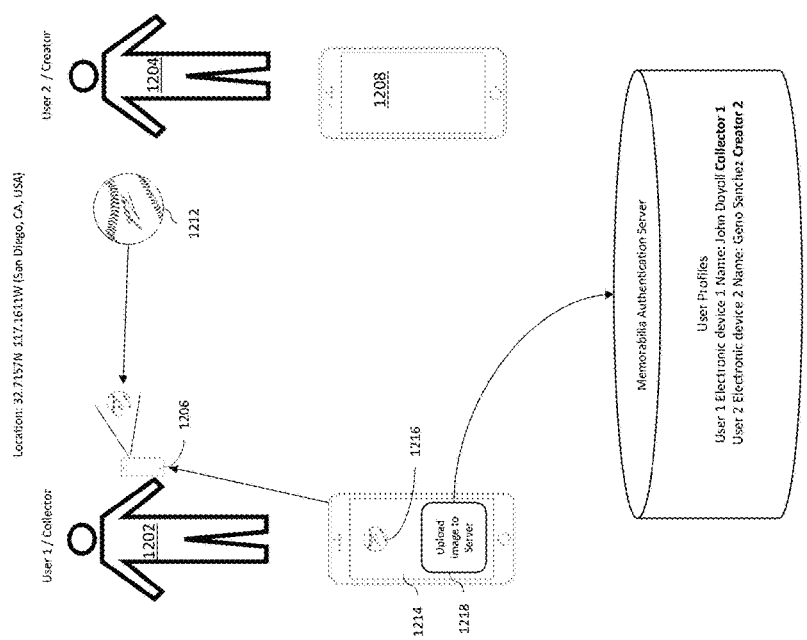

The location information obtained by the mobile devices 1202 and 1208 can be uploaded to a server, such as server 1212. As shown in FIG. 12B, the location of the memorabilia collector 1202 and the memorabilia creator 1204 can be verified and can be based on the relative positions of the mobile devices 1206 and 1208 associated with the memorabilia collector 1202 and the memorabilia creator 1204, respectively. The server 1210 can be configured to only permit the creation of an authentication certificate for a memorabilia item if the memorabilia collector 1202 and the memorabilia creator 1204 were within a threshold distance 1220 of each other around the time the memorabilia item was said to be created.

Figure 12D:
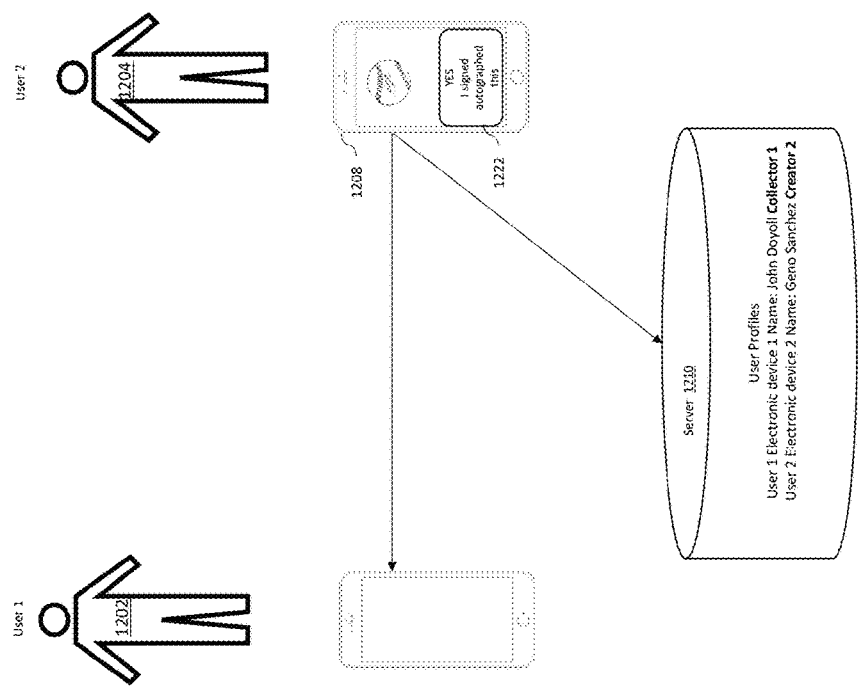
Figure 12C:
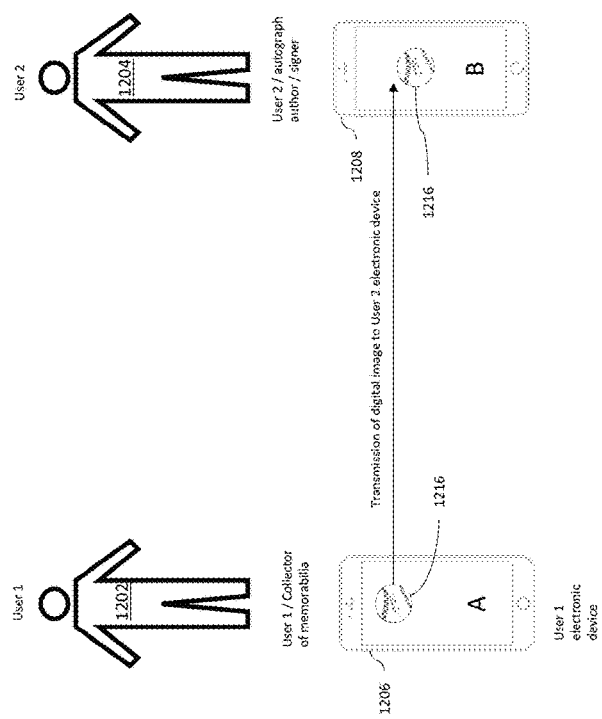
Figure 12G:
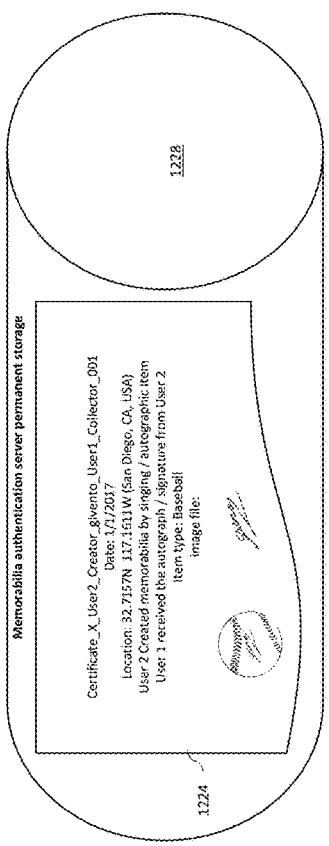

FIG. 12C illustrates the image 12176 of the memorabilia item, that was taken by the memorabilia collector 1202 by their associated mobile device 1206, being transferred to the mobile device 1208 associated with the memorabilia creator 1204.

FIG. 12D shows the memorabilia creator 1204 verifying that the image 1216 is of the memorabilia item created by the memorabilia creator. In response to the verifying, the mobile device 1208 associated with the memorabilia creator can be configured to send a signal to the server 1210 that the memorabilia creator 1204 has verified the image 1216 of the memorabilia item as being authentic.

FIG. 12E shows the server 1210 generating an authentication certificate 1224 for the memorabilia item. The server 1210 can be configured to analyze the image 1216 of the memorabilia item and identify the memorabilia item and/or the autograph on the memorabilia item. The server 1210 can be configured to isolate the pixels from the image that are representative of the memorabilia item and/or the autograph.

FIG. 12F shows copies 1226 of the authentication certificate being provided to the memorabilia being provided to the memorabilia collector 1202 and the memorabilia creator 1204 on their mobile devices 1206 and 1208, respectively.

FIG. 12H illustrates the authentication certificate 1224 being stored in electronic storage 1228.

FIGS. 13A-13F show views of graphical user interfaces having one or more features consistent with the presently described subject matter. FIGS. 13A-13F illustrate graphical user interfaces presented to memorabilia collectors and memorabilia creators during a mass memorabilia creation event. For example, a celebrity mass-signing event.

FIG. 13A illustrates a graphical user interface 1304 presented on a mobile device 1302 associated with a memorabilia creator. The graphical user interface 1304 can be configured to facilitate creation, by a memorabilia creator, of a mass memorabilia creation event. The graphical user interface 1304 can include a plurality of information fields configured to allow the memorabilia creator to enter information associated with the mass memorabilia creation event. The memorabilia creator can specify the memorabilia item type, the number of autographs being provides, a start time and end time for the mass memorabilia item creation event, a type of event, a location of the event, or the like. In response to the memorabilia creator initiating a mass memorabilia creation event, the server 1306 supporting the creation and/or management of authentication certificates for the memorabilia items can generate a start code 1308 and, optionally, an end code 1310. The codes 1308 and 1310 can be numerical, alphanumerical, bar codes, two-dimensional bar codes, three-dimensional bar codes, verbal codes, or the like.

FIG. 13B shows that the codes 1308 and 1310 can be printed. In some variations, the start code 1308 and the end code 1310 can be transmitted from the server 1306 to the mobile device 1302 associated with the memorabilia creator. The application running on the mobile device 1302 can be configured to facilitate printing of the start code 1308 and the end code 1310. The application can be configured to cause the mobile device 1302 to send instructions to a printer to print the start code 1308 and the end code 1310 on separate sheets, 1312 and 1314, respectively. In some examples, the start code 1308 and the end code 1310 can be printed in large format, for example, one square meter in size each.

FIG. 13C illustrates a graphical user interface 1326 presented on a display of a mobile device 1320 associated with a memorabilia collector that has attended the mass memorabilia item creation event. The graphical user interface 1326 can be configured to facilitate an interaction with the memorabilia collector to cause the mobile device 1320 to capture an image of the start code. In response to capturing the image of the start code, the mobile device 1320 can be configured to allow the memorabilia collector to capture an image of the autographed memorabilia item using a camera of the mobile device 1320.

FIG. 13D illustrates a memorabilia creator 1330 signing a memorabilia item 1332.

FIG. 13E illustrates a graphical user interface 1334 presented on the mobile device 1320 of the memorabilia collector. The graphical user interface 1334 can be configured to capturing of an image of the memorabilia item 1332. The mobile device 1320 can be configured to upload the image of the memorabilia item to the server 1306. Due to the memorabilia collector scanning the start code 1308, the image of the memorabilia item 1332 can be automatically associated with the information provided by the memorabilia creator about the mass memorabilia item creation event, such as the identity of the memorabilia creator, the location, the type of mass memorabilia item creation event, or the like.

FIG. 13F illustrates the creation of the authentication certificate 1337 for the memorabilia item at a mass memorabilia creation event. The authentication certificate 1337 may only be created in response to the memorabilia collector scanning the end code 1310. In response to the mobile device 1320 being used to scan the end code 1310, the mobile device 1320 can transmit a signal to the server 1306 that the memorabilia collector has scanned the end code 1310. In response to receiving the end code, the server 1306 can finalize the authentication certificate 1337 for the memorabilia item and send the authentication certificate 1337 to a non-volatile memory storage system 1307.

In some implementations a graphical user interface is provided for facilitating the authentication of memorabilia items. The graphical user interface can be generated using one or more operations. The one or more operations can include displaying, in response to a user instruction to obtain a digital image of a memorabilia item, video feed obtained by a camera of an electronic device associated with the user. The memorabilia item can be identified within the video feed by determining a set of pixels of the video feed associated with the identified memorabilia item can be identified. One or more pixels of the set of pixels can be identified that include a likeness of a creator of the memorabilia item. The set of pixels and an indication of the identified one or more pixels can be transmitted to a memorabilia authentication server.

Without in any way limiting the scope, interpretation, or application of the claims appearing herein, a technical effect of one or more of the example embodiments disclosed herein may include digitizing verification certificates and verification records of memorabilia items. Digitally tracking the memorabilia items and digitally verifying the authenticity of memorabilia items by performing image analysis digital images obtained of the memorabilia items when the memorabilia items are created and transferred.

The digitization of verification certificates allows a memorabilia creator to control whether a memorabilia item is authenticated or not. Currently, the only means to verify a memorabilia item is to compare signatures on the memorabilia item with a known signature of the memorabilia creator. This allows counterfeiters to create counterfeit memorabilia items that include signatures that resemble the memorabilia creator's signature. The presently described subject matter allows a memorabilia creator to verify that a signed (to otherwise) item is a memorabilia item. The unique identifier attached to that memorabilia item can ensure that no other memorabilia item can be created using that unique identifier. Any item having a signature resembling that of the memorabilia creator's will not be authenticated as a memorabilia item without this unique identifier. As a result, memorabilia creators can control their likeness in perpetuity.

Some implementations of the presently described subject matter creates multiple barriers to counterfeiting. For example, the presently described subject matter can require the initial memorabilia collector and the memorabilia creator to come into contact. In another example, the memorabilia creator can control whether they verify the memorabilia item as being authentic or not. Some implementations of the presently described subject matter allows a memorabilia creator to generate different signatures or change their signature and still maintain the authenticity of the memorabilia items they create. Some implementations of the presently described subject matter removes unreliable and time consuming practices currently performed when authenticating memorabilia items.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method to be performed by at least one computer processor forming at least a part of a computing system, the method comprising:
receiving, from a first electronic device associated with a first user, a first digital image having a digital representation of an item and an indication of a first location of the first electronic device, the first user having a first user profile electronically stored on an authentication server, the item having an association with a second user, the second user different from the first user, the second user having a second user profile electronically stored on the authentication server;
determining that the first location of the first electronic device is within a defined threshold distance from a second location of a second electronic device;
transmitting, in response to the determining, the first digital image to the second electronic device;
receiving, from the second electronic device, a verification that the first digital image includes the digital representation of the item having the association with the second user, the verification being input by the second user;
generating, in response to receiving the verification, a record of ownership to associate with the item and the first user;
storing, in a secure electronic storage and associated with the first user profile, the record of ownership;
receiving a request to transfer the record of ownership, associated with the item, from the first user to a third user, the third user having a third user profile electronically stored on the authentication server;

updating, in the secure electronic storage, the record of ownership associated with the item to associate the record of ownership with the third user;

receiving, from the first electronic device, a second digital image having a digital representation of the item;

identifying a first set of pixels within the first digital image that correspond to the item;

identifying a second set of pixels within the second digital image that correspond to the item; and, verifying that the second set of pixels corresponds to the first set of pixels, wherein the first set of pixels includes at least a mark placed on the item by the second user.

2. The method of claim 1, further comprising:

transmitting, to the second electronic device, a request to authorize the transfer the record of ownership, associated with the item, from the first user to the third user; and receiving, from the second electronic device, an authorization to execute the transfer the record of ownership.

3. The method of claim 1, further comprising:

receiving, from the first electronic device, a second digital image of the memorabilia item, at least a portion of the second digital image comprising a mark placed on the item by the second user;

transmitting, to the second electronic device, the second digital image of the item; and receiving, from the second electronic device, a verification from the second user that the at least the portion of the second digital image comprises the mark.

4. The method of claim 1, wherein the verifying that the first location is within a defined threshold of a second location further comprises:

receiving, from the first electronic device, an authentication code, the authentication code associated with the second user.

5. The method of claim 1, wherein the verifying that the first location is within a defined threshold of a second location further comprises:

receiving, from the first electronic device, first location information associated with the first electronic device; and receiving, from the second electronic device, second location information associated with the second electronic device.

6. The method of claim 4, wherein the first location information
comprises satellite geolocation information.

7. The method of claim 4, wherein the first location information
comprises a local area network identity within communication range of the first location.

8. The method of claim 1, further comprising:
publishing, to a distributed database system, the record of ownership associated with the item.

9. The method of claim 1, further comprising:
publishing, to a distributed database system, the updated record of ownership associated with the item.

10. The method of claim 1, wherein the record of ownership associated with the item comprises the first digital image and an identity of the first user.

11. A system comprising:
one or more processors; and
a memory comprising instructions which, when executed by the one or more processors, cause the one or more processors to perform operations comprising:
receiving, from a first electronic device associated with a first user, a first digital image having a digital representation of an a item and an indication of a first location of the first electronic device, the first user having a first user profile electronically stored on an authentication server, the item having an association with a second user, the second user different from the first user, and the second user having a second user profile electronically stored on the authentication server;

determining that the first location of the first electronic device is within a defined threshold distance from a second location of a second electronic device;

transmitting, in response to the determining, the first digital image to the second electronic device;

receiving, from the second electronic device, a verification that the first digital image includes the digital representation of the item having the association with the second user, the verification being input by the second user;

generating, in response to receiving the verification, a record of ownership to associate with the item and the first user;

storing, in a secure electronic storage and associated with the first user profile, the record of ownership;

receiving a request to transfer the record of ownership associated with the item from the first user to a third user, the third user having a third user profile electronically stored on the authentication server;

updating, in the secure electronic storage, the record of ownership associated with the item to reflect ownership of the item by the third user;

receiving, from the first electronic device, a second digital image having a digital representation of the item;

identifying a first set of pixels within the first digital image that correspond to the item;

identifying a second set of pixels within the second digital image that correspond to the item; and, verifying that the second set of pixels corresponds to the first set of pixels, wherein the first set of pixels include at least likeness mark placed on the item by the second user.

12. The system of claim 11, wherein the operations further comprise:

transmitting, to the second electronic device, a request to authorize the transfer the record of ownership associated with the item from the first user to the third user; and receiving, from the second electronic device, an authorization to execute the transfer of the record of ownership.

13. The system of claim 11, wherein the operations further comprise:

receiving, from the first electronic device, a second digital image of the memorabilia item, at least a portion of the second digital image comprising a mark placed on the item by the second user;

transmitting, to the second electronic device, the second digital image of the item; and receiving, from the second electronic device, a verification from the second user that the at least the portion of the second digital image comprises the mark.

14. The system of claim 11, wherein the verifying that the first location is within a defined threshold of a second location further comprises:

receiving, from the first electronic device, an authentication code, the authentication code associated with the second user.

15. The system of claim 11, wherein the verifying that the first location is within a defined threshold of a second location further comprises:
- receiving, from the first electronic device, first location information associated with the first electronic device; and
- receiving, from the second electronic device, second location information associated with the second electronic device.

16. The system of claim 14, wherein the first location information comprises satellite geolocation information.

17. The system of claim 14, wherein the first location information comprises a local area network identity within communication range of the first location.

18. The system of claim 11, wherein the operations further comprise:
- publishing, to a distributed database system, the record of ownership associated with the item.

19. The system of claim 11, wherein the operations further comprise:
- publishing, to a distributed database system, the updated record of ownership associated with the item.

20. The system of claim 11, wherein the record of ownership associated with the item comprises the first digital image and an identity of the first user.

* * * * *